United States Patent
Obata et al.

(10) Patent No.: US 10,011,276 B2
(45) Date of Patent: Jul. 3, 2018

(54) COLLISION AVOIDANCE DEVICE

(71) Applicant: Mitsubishi Electric Corporation, Tokyo (JP)

(72) Inventors: Yasushi Obata, Tokyo (JP); Hiroshi Kameda, Tokyo (JP); Kyosuke Konishi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 119 days.

(21) Appl. No.: 15/126,731

(22) PCT Filed: Mar. 19, 2015

(86) PCT No.: PCT/JP2015/058283
§ 371 (c)(1),
(2) Date: Sep. 16, 2016

(87) PCT Pub. No.: WO2015/156097
PCT Pub. Date: Oct. 15, 2015

(65) Prior Publication Data
US 2017/0210379 A1   Jul. 27, 2017

(30) Foreign Application Priority Data

Apr. 8, 2014   (WO) .................. PCT/JP2014/060192

(51) Int. Cl.
*B60W 30/095* (2012.01)
*B60W 30/09* (2012.01)
(Continued)

(52) U.S. Cl.
CPC ............ *B60W 30/09* (2013.01); *B60W 10/18* (2013.01); *B60W 10/20* (2013.01);
(Continued)

(58) Field of Classification Search
None
See application file for complete search history.

(56) References Cited

U.S. PATENT DOCUMENTS

| | | |
|---|---|---|
| 2002/0135467 A1 | 9/2002 | Koike |
| 2003/0006889 A1 | 1/2003 | Koike |
| | (Continued) | |

FOREIGN PATENT DOCUMENTS

| | | |
|---|---|---|
| JP | 08-271617 A | 10/1996 |
| JP | 2000-276696 A | 10/2000 |
| | (Continued) | |

OTHER PUBLICATIONS

An Office Action; "Notification of Reasons for Refusal," issued by the Japanese Patent Office dated Jan. 10, 2017, which corresponds to Japanese Patent Application No. 2016-512646 and is related to U.S. Appl. No. 15/126,731; with English language partial translation.

(Continued)

*Primary Examiner* — Brent Swarthout
(74) *Attorney, Agent, or Firm* — Studebaker & Brackett PC

(57) ABSTRACT

A configuration includes: a target-motion prediction unit (5) that calculates predicted movement ranges of one or more other vehicles (60) based on target tracking; an inter-target collision possibility estimator (6) that estimates a collision possibility based on overlap of predicted movement ranges of the other vehicles (60); a target-motion re-prediction unit (7) that again calculates predicted movement ranges to avoid collision when the collision possibility between the other vehicles (60) exists; an own-motion prediction unit (10) that calculates a predicted movement range of a user's vehicle (50) based on an observation result; and an own-collision possibility estimator (11) that estimates collision possibilities between the user's vehicle (50) and the other vehicles (Continued)

(60) based on overlap of the final predicted movement ranges of the other vehicles (60) and the predicted movement range of the user's vehicle (50).

7 Claims, 17 Drawing Sheets

(51) Int. Cl.
    *G08G 1/16*     (2006.01)
    *B60W 30/18*     (2012.01)
    *B60W 10/18*     (2012.01)
    *B60W 10/20*     (2006.01)
    *B60W 30/14*     (2006.01)
    *B60W 30/16*     (2012.01)

(52) U.S. Cl.
    CPC .......... *B60W 30/143* (2013.01); *B60W 30/16* (2013.01); *B60W 30/18163* (2013.01); *G08G 1/167* (2013.01); *B60W 2510/18* (2013.01); *B60W 2510/20* (2013.01); *B60W 2520/105* (2013.01); *B60W 2550/10* (2013.01); *B60W 2550/306* (2013.01); *B60W 2550/308* (2013.01); *B60W 2710/18* (2013.01); *B60W 2710/20* (2013.01); *B60W 2720/106* (2013.01); *B60W 2750/306* (2013.01); *B60W 2750/308* (2013.01)

(56) References Cited

U.S. PATENT DOCUMENTS

| | | | |
|---|---|---|---|
| 2003/0009275 A1 | 1/2003 | Koike | |
| 2008/0300787 A1* | 12/2008 | Zeng | G01S 7/4026 |
| | | | 701/301 |
| 2013/0226432 A1 | 8/2013 | Tsuruta et al. | |
| 2015/0112571 A1* | 4/2015 | Schmudderich | B60W 30/08 |
| | | | 701/93 |
| 2015/0183431 A1* | 7/2015 | Nanami | B60W 40/04 |
| | | | 701/301 |

FOREIGN PATENT DOCUMENTS

| | | |
|---|---|---|
| JP | 2006-031443 A | 2/2006 |
| JP | 2007-249324 A | 9/2007 |
| JP | 2009-043090 A | 2/2009 |
| JP | 2011-220727 A | 11/2011 |
| JP | 2013-180606 A | 9/2013 |
| JP | 5336800 B2 | 11/2013 |
| JP | 5607409 B2 | 10/2014 |
| WO | 2015/155833 A1 | 10/2015 |

OTHER PUBLICATIONS

International Search Report issued in PCT/JP2015/058283; dated Jun. 16, 2015.

* cited by examiner

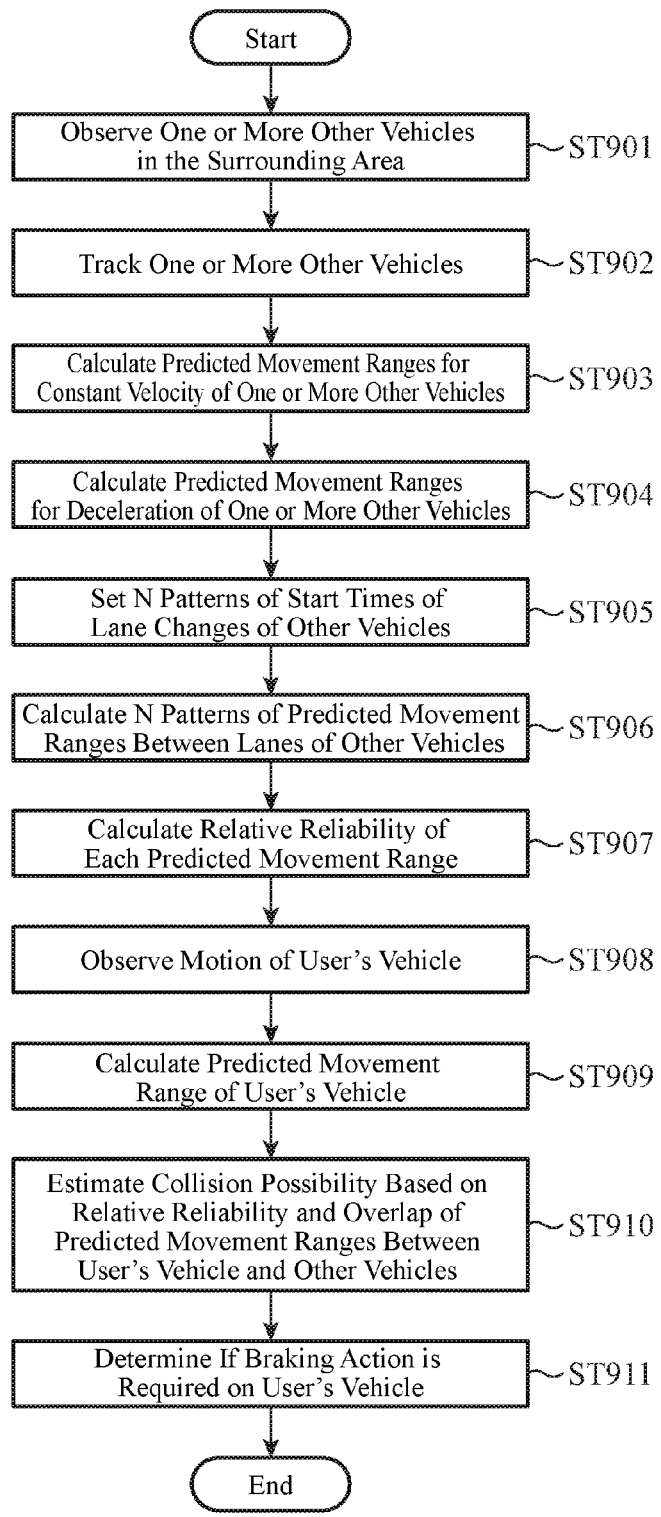

COLLISION AVOIDANCE DEVICE

FIELD OF THE INVENTION

The present invention relates to a collision avoidance device to predict motion of a target existing around a moving body on which the collision avoidance device is installed, to avoid collision with the moving body.

BACKGROUND OF THE INVENTION

Conventionally known are systems to observe a surrounding target (automobile, ship, airplane, etc.) by using a sensor such as radar or camera mounted on a moving body (automobile, ship, airplane, etc.) and to support smooth operation so as to prevent collision between the moving body and target.

Techniques to support operation according to information obtained from the sensor are described in a number of papers, patent references, and the like. Various proposals are made for devices and methods to implement these techniques.

Representative examples include a collision avoidance technique for automobiles. In this technique, another vehicle (target) is observed by radar or an optical sensor mounted to a user's vehicle (moving body), and, when it is found that a distance to the user's vehicle and an approaching velocity reach a threshold, it determines that there is a possible collision, and it warns or controls travelling itself of the user's vehicle.

Further, in technique disclosed in Patent reference 1, by extrapolating from estimation results of motions of the user's vehicle and another vehicle as of the present time, prediction ranges of the user's vehicle and another vehicle at a certain time in the future are calculated, and the collision possibility is determined according to whether they overlap with each other. For example in FIG. 15, prediction ranges of a user's vehicle 50 and the other vehicle 60 are calculated for four sampling timings. In this example, the prediction range of the user's vehicle 50 and that of the other vehicle 60 does not overlap at any of the sampling timings and thus determination of "no collision possibility" is made.

PATENT REFERENCES

Patent reference 1: Japanese Patent Application Publication No. 2000-276696.

Patent reference 2: Japanese Patent Application Publication No. H8(1996)-271617.

SUMMARY OF THE INVENTION

Problems to be Solved by the Invention

However, in the technique disclosed in Patent reference 1, a position of the vehicle 60 in the future is predicted by extrapolating from the motion of the vehicle 60 as of the present time. Therefore, as illustrated in FIG. 16, when the other vehicle 60 abruptly intrudes in the front of the user's vehicle 50, a discrepancy between a predicted motion (broken line illustrated in FIG. 16) and an actual motion (solid line illustrated in FIG. 16) of the other vehicle 60 becomes large. This results in a problem that collision prediction is difficult.

Here, causes of intrusion may include possible collision when a lane is kept since a vehicle in front of a vehicle is slow. One example is illustrated in FIG. 17. In this example, the user's vehicle 50 travels on the right lane while other vehicles 60a and 60b travel on the left lane. A velocity of the vehicle 60a in the front is extremely smaller than that of the vehicle 60b. In this case, the vehicle 60b may intrude in the lane where the user's vehicle 50 travels on in order to avoid collision with the vehicle 60a. Therefore, the detection of motions of multiple vehicles (the other vehicles 60a and 60b in the example of FIG. 17) shall allow for prediction of the intrusion.

This invention has been made in order to solve the aforementioned problems, and an object of the invention is to provide a collision avoidance device capable of detecting motions of multiple targets to thereby improve the accuracy in motion prediction.

Means for Solving the Problem

A collision prevention device according to the present invention includes: a target observation sensor to observe one or more targets existing around a moving body on which the collision avoidance device is installed; a target tracker to, assuming that one or more motion models selected from among a plurality of prescribed motion models are applied, track the one or more targets while assigning weights indicative of reliabilities of the one or more motion models to the one or more motion models, on a basis of an observation result from the target observation sensor; a target-motion prediction unit to calculate predicted movement ranges of the one or more targets, based on a tracking result from the target tracker; an inter-target collision possibility estimator to, when a plurality of the targets exists, estimate a collision possibility between the targets based on overlap of the predicted movement ranges of the targets calculated by the target-motion prediction unit; a target-motion re-prediction unit to, when the inter-target collision possibility estimator estimates possible collision between the targets, change the weights so as to prioritize a motion model causing collision to be avoided, and to again calculate predicted movement ranges of the targets before the targets take actions to avoid collision; an own-motion sensor to observe a motion of the moving body; an own-motion prediction unit to calculate a predicted movement range of the moving body based on an observation result from the own-motion sensor; and an own-collision possibility estimator to estimate collision possibilities between the moving body and the one or more targets, based on overlap between the predicted movement range of the moving body calculated by the own-motion prediction unit, and the predicted movement ranges of the targets with no collision possibility between the targets, calculated by the target-motion prediction unit or the target-motion re-prediction unit.

Advantageous Effect of the Invention

This invention is configured in the above manner and thus makes it possible to detect motions of multiple targets to thereby improve the accuracy in motion prediction.

BRIEF DESCRIPTIONS OF THE FIGURES

FIG. 9 is a flowchart illustrating a processing procedure of the collision avoidance device according to the second embodiment of the invention.

Figure 10A:
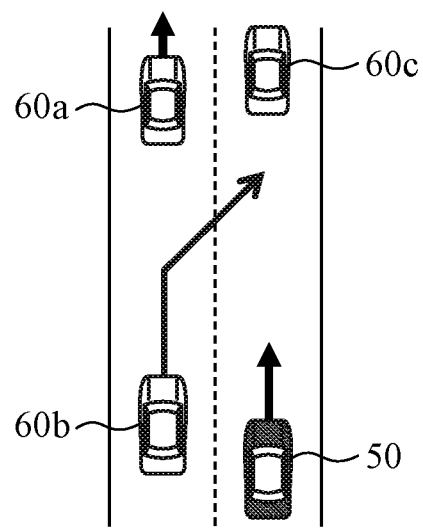
Figure 10B:
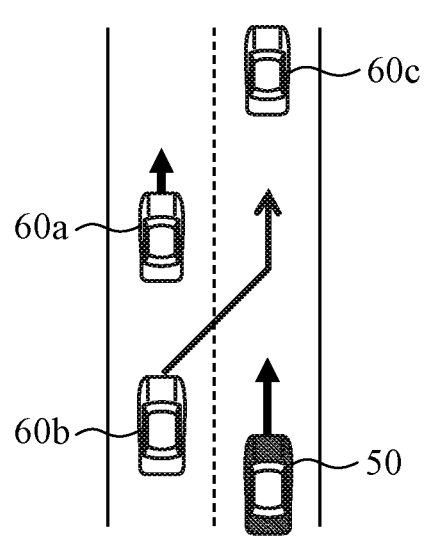

FIGS. 10(a) and 10(b) are diagrams illustrating cases where start times of lane changes of one vehicle are different.

Figure 11:
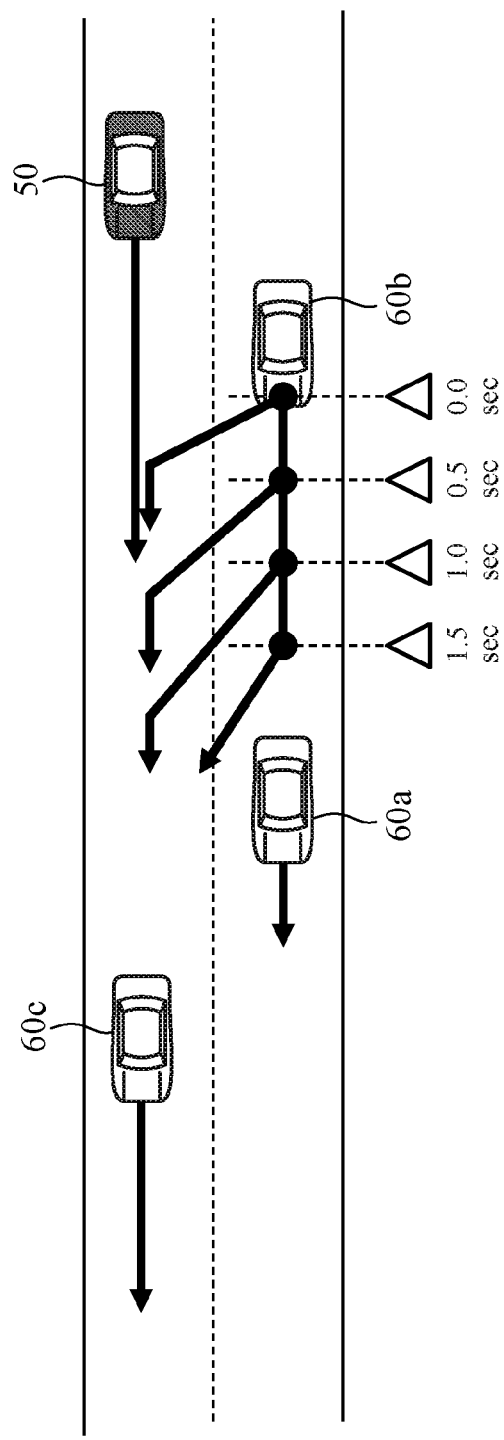

FIG. 11 is a diagram illustrating exemplary predicted movement ranges of one vehicle that possibly makes a lane change.

Figure 12:
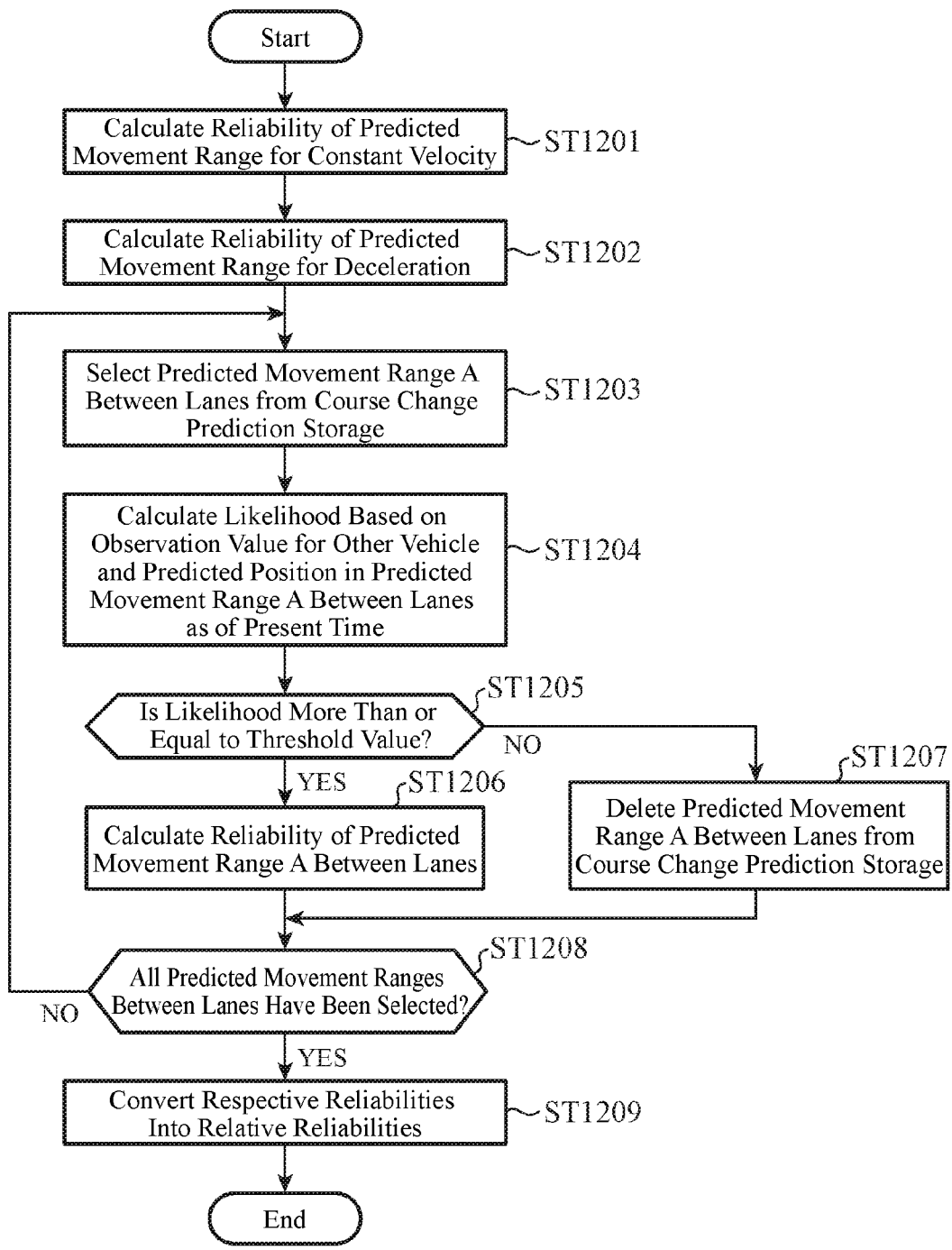

FIG. 12 is a flowchart illustrating a processing procedure of a reliability comparator according to the second embodiment of the invention.

Figure 13:
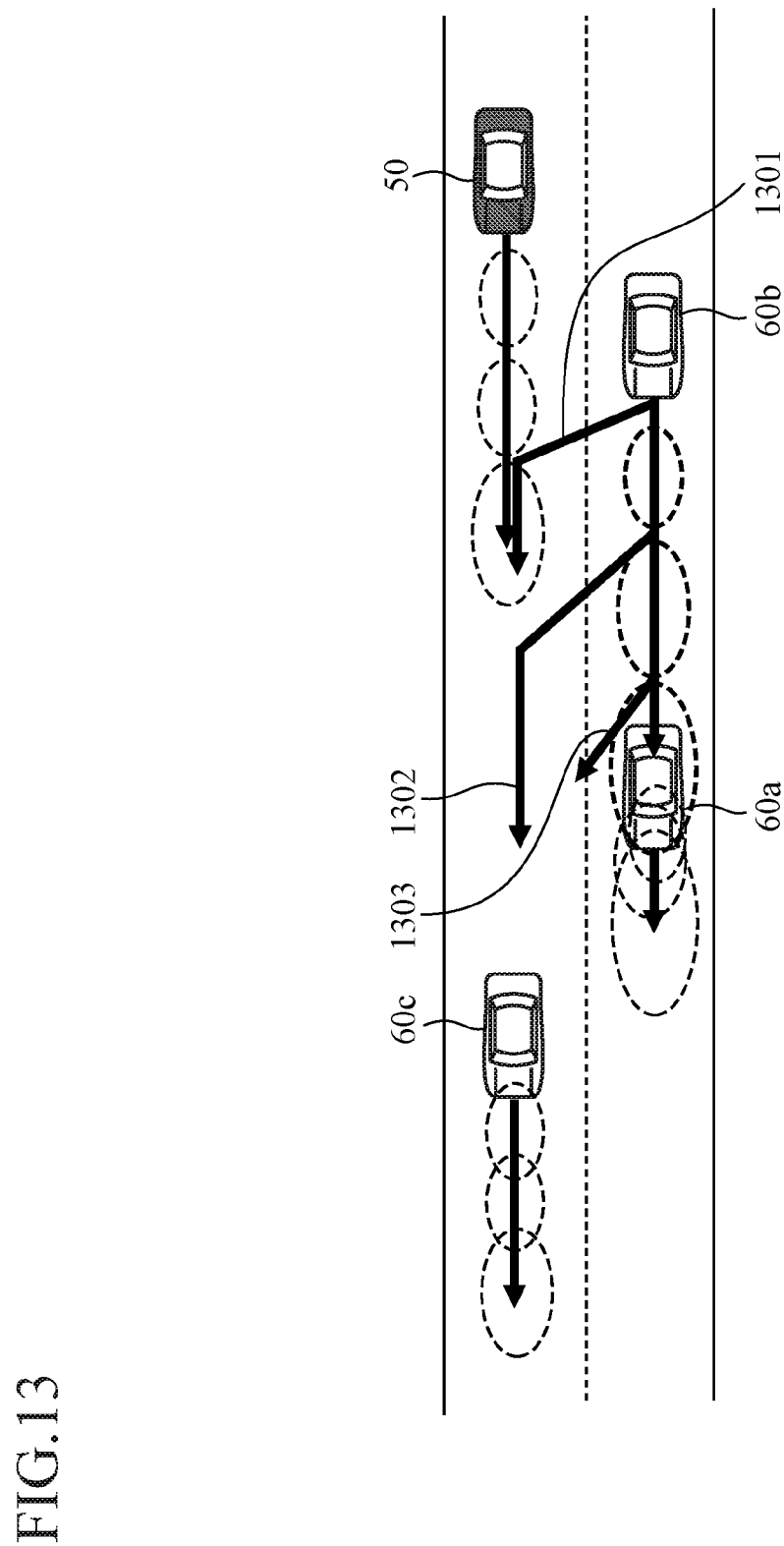

FIG. 13 is a diagram illustrating exemplary reliability calculated by the reliability comparator according to the second embodiment of the invention.

Figure 14:
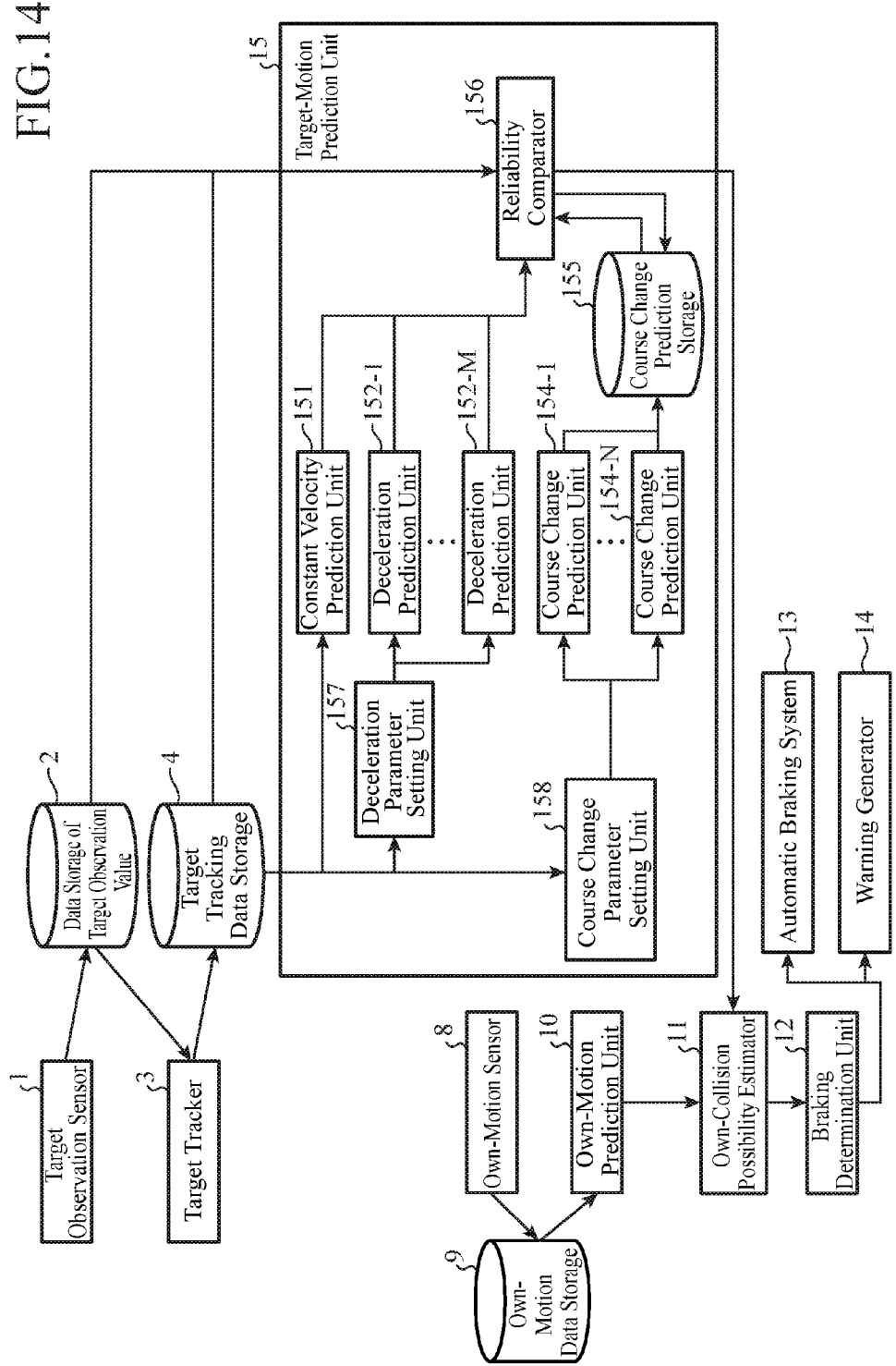

FIG. 14 is a block diagram illustrating a configuration of a collision avoidance device according to a third embodiment of the invention.

Figure 15:
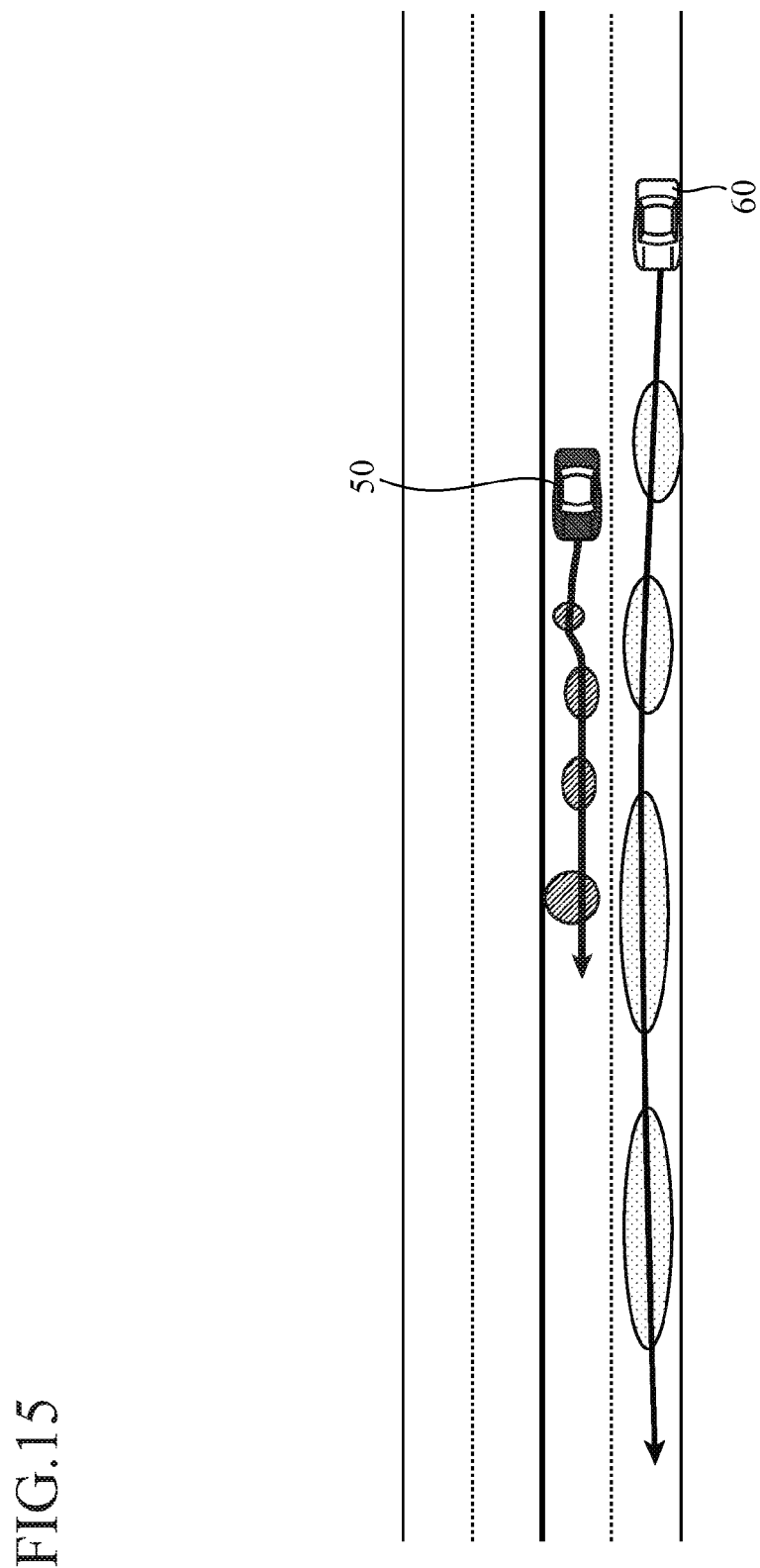

FIG. 15 is a diagram illustrating exemplary predicted movement ranges of a user's vehicle and the other vehicle in a conventional collision avoidance device.

Figure 16:
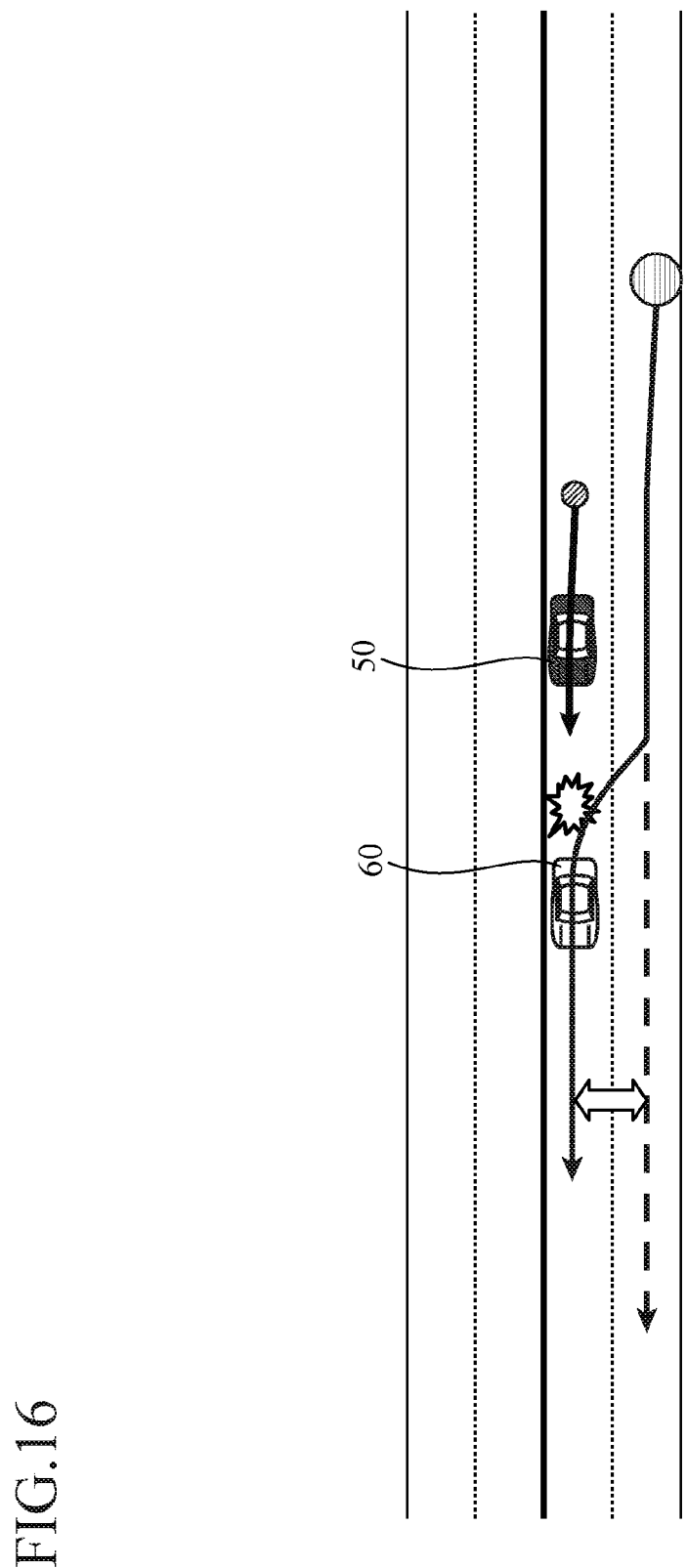

FIG. 16 is a diagram illustrating a difference between a predicted movement range of the other vehicle and an actual motion upon occurrence of intrusion in the conventional collision avoidance device.

Figure 17:
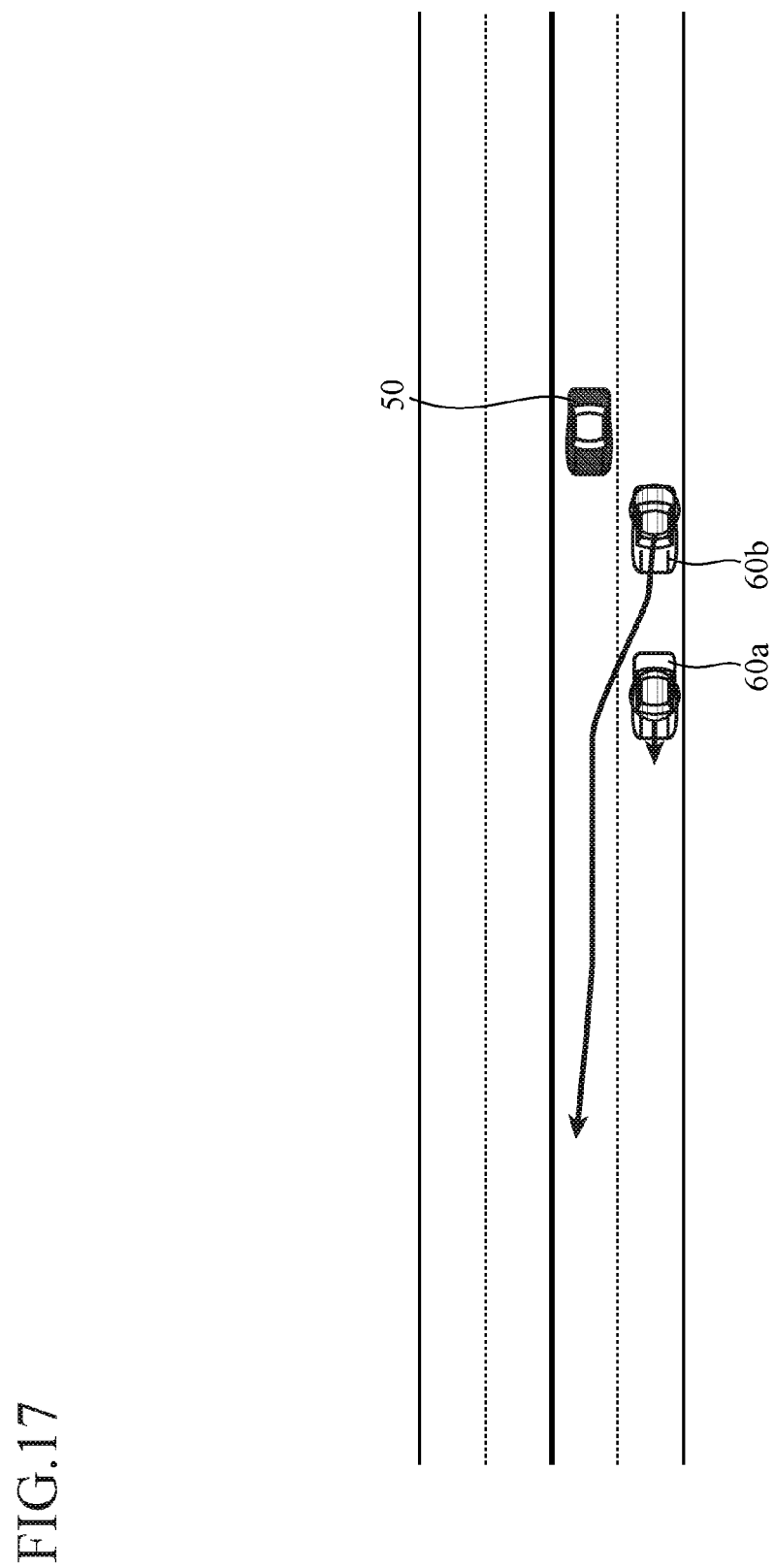

FIG. 17 is a diagram illustrating an exemplary situation that may cause intrusion of one vehicle.

EMBODIMENTS OF THE INVENTION

In the following, embodiments of the invention will be described in detail with reference to the drawings.

First Embodiment

Figure 1:
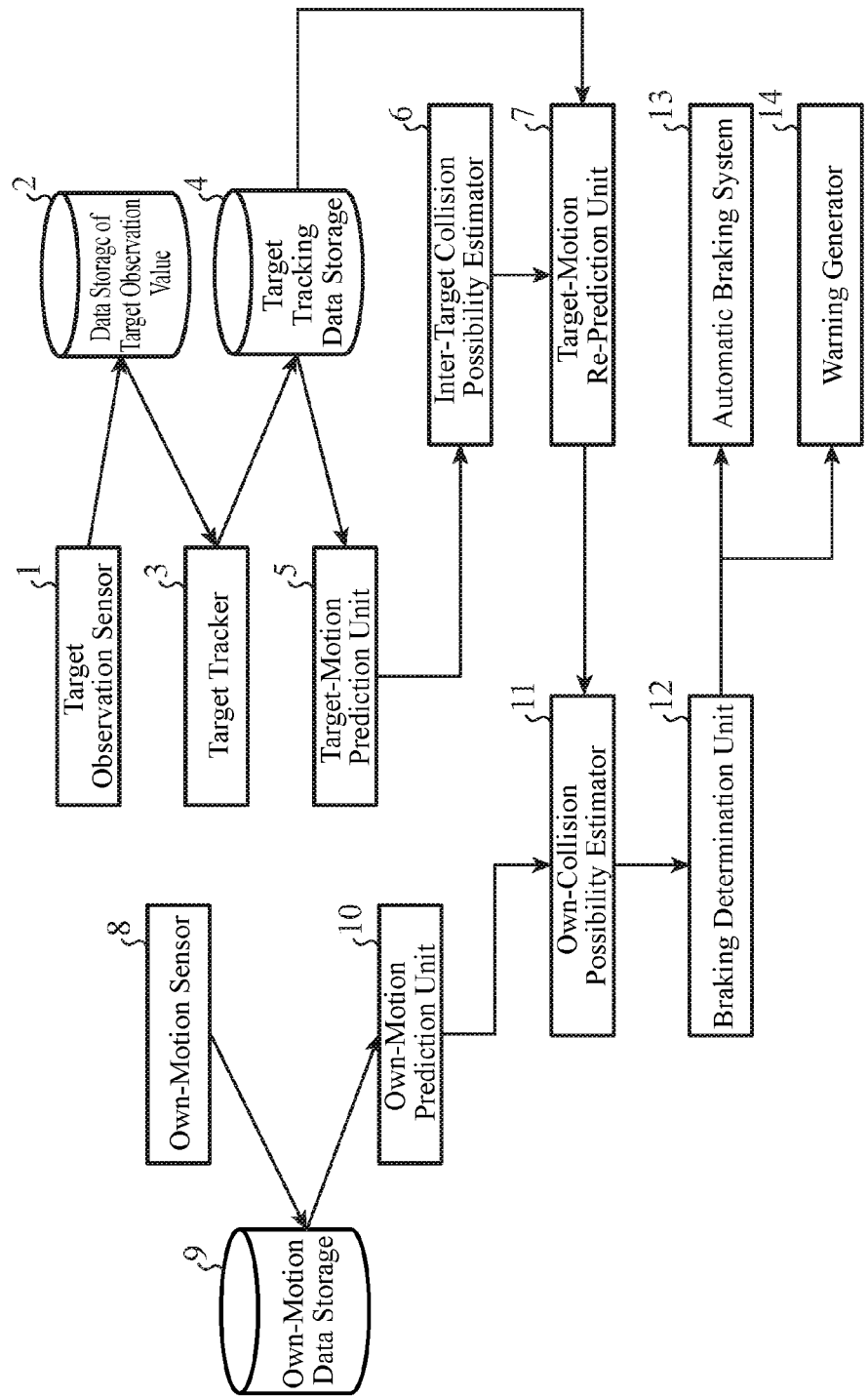
FIG. 1 is a block diagram illustrating a configuration of a collision avoidance device according to a first embodiment of the invention.

FIG. 1 is a diagram illustrating a configuration of a collision avoidance device according to a first embodiment of the invention. In each of the embodiments below, a case where a collision avoidance device of the invention is applied to an automobile is described.

A collision avoidance device is mounted to a user's vehicle (moving body) 50 and predicts motions of the user's vehicle 50 and one or more vehicles (targets) 60 existing therearound to avoid collision between the user's vehicle 50 and the other vehicles 60. This collision avoidance device includes, as illustrated in FIG. 1, a target observation sensor 1, data storage 2 of target observation values, target tracker 3, target tracking data storage 4, target-motion prediction unit 5, inter-target collision possibility estimator 6, target-motion re-prediction unit 7, own-motion sensor 8, own-motion data storage 9, own-motion prediction unit 10, own-collision possibility estimator 11, braking determination unit 12, automatic braking system 13, and warning generator 14.

The target observation sensor 1 observes one or more other vehicles 60 existing around the user's vehicle 50 on which the collision avoidance device is installed. The target observation sensor 1 periodically performs observation of the other vehicles 60 existing in the surroundings, and positions of the other vehicles 60 are calculated from the observation result. Information representing the observation results from the target observation sensor 1 (target observation value data) is output to the data storage 2 of target observation values.

The data storage 2 of target observation values stores the target observation value data from the target observation sensor 1. The data storage 2 of target observation values is configured by HDDs, DVDs, memories, or the like.

The target tracker 3 tracks one or more other vehicles 60 on the basis of the target observation value data stored in the data storage 2 of target observation values. The target tracker 3 performs time series processing of positions of the other vehicles 60 which are obtained by the target observation sensor 1 and thereby estimates more accurate motion quantities that include positions and velocities of the other vehicles 60. Information representing the tracking result from the target tracker 3 (target tracking data) is output to the target tracking data storage 4.

The target tracking data storage 4 stores the target tracking data from the target tracker 3. The target tracking data storage 4 is configured by HDDs, DVDs, memories, or the like.

The target-motion prediction unit 5 calculates predicted movement ranges of one or more other vehicles 60, based on the target tracking data stored in the target tracking data storage 4. Information representing the predicted movement ranges of the other vehicles 60 calculated by the target-motion prediction unit 5 is output to the inter-target collision possibility estimator 6.

When there exist multiple other vehicles 60, the inter-target collision possibility estimator 6 estimates collision possibility between these other vehicles 60, based on overlap between predicted movement ranges of those other vehicles 60 calculated by the target-motion prediction unit 5. Information representing the collision possibility between those other vehicles 60 from the inter-target collision possibility estimator 6 is output to the target-motion re-prediction unit 7.

When the inter-target collision possibility estimator 6 estimates possible collision between other vehicles 60, the target-motion re-prediction unit 7 again calculates predicted movement ranges of the vehicles 60 to avoid collision, based on the target tracking data stored in the target tracking data storage 4. Information representing the predicted movement ranges of the vehicles 60 calculated again by the target-motion re-prediction unit 7 is output to the own-collision possibility estimator 11.

Incidentally, when the inter-target collision possibility estimator 6 estimates no collision possibility between other vehicles 60, or when two or more other vehicles do not exist, information representing the predicted movement ranges of one or more other vehicles 60 calculated by the target-motion prediction unit 5 is output to the own-collision possibility estimator 11 as it is.

The own-motion sensor 8 observes the motion of the user's vehicle 50. This own-motion sensor 8 is, for example configured by the user's vehicle travelling meter or the like, and observes motion quantities that include a position and velocity of the user's vehicle 50. Information representing an observation result from the own-motion sensor 8 (own motion data) is output to the own-motion data storage 9.

The own-motion data storage 9 stores the own-motion data from the own-motion sensor 8. The own-motion data storage 9 is configured by HDDs, DVDs, memories, or the like.

The own-motion prediction unit 10 calculates a predicted movement range of the user's vehicle 50, based on the own-motion data stored in the own-motion data storage 9. Information representing the predicted movement range of the user's vehicle 50 calculated by the own-motion prediction unit 10 is output to the own-collision possibility estimator 11.

The own-collision possibility estimator 11 estimates collision possibilities between the user's vehicle 50 and other vehicles 60, based on overlap between the predicted movement range of the user's vehicle 50 calculated by the own-motion prediction unit 10 and the predicted movement ranges of the vehicles 60 with no collision possibility between the vehicles 60, calculated by the target-motion prediction unit 5 or target-motion re-prediction unit 7. Information representing the collision possibilities between the user's vehicle 50 and other vehicles 60, which is estimated by the own collision possibility estimator 11, is output to the braking determination unit 12.

The braking determination unit 12 determines if braking is required on the user's vehicle 50 on the basis of the estimation result from the own-collision possibility estimator 11. Information representing the determination result from the braking determination unit 12 is output to the automatic braking system 13 and warning generator 14.

The automatic braking system 13 executes a deceleration function of the user's vehicle 50 by automatic braking when the braking determination unit 12 determines that braking of the user's vehicle 50 is required.

The warning generator 14 represents a message or outputs sound to convey, to a driver of the user's vehicle 50, that brake operation is required at the present time when the braking determination unit 12 determines that braking of the user's vehicle 50 is required.

Incidentally, the target tracker 3, target-motion prediction unit 5, inter-target collision possibility estimator 6, target-motion re-prediction unit 7, own-motion prediction unit 10, own-collision possibility estimator 11, braking determination unit 12, automatic braking system 13, and warning generator 14 are implemented by program processing based on software, used in a CPU.

Next, a flow of processing by the collision avoidance device configured in the above manner will be described with reference to FIGS. 2 to 7.

Figure 2:
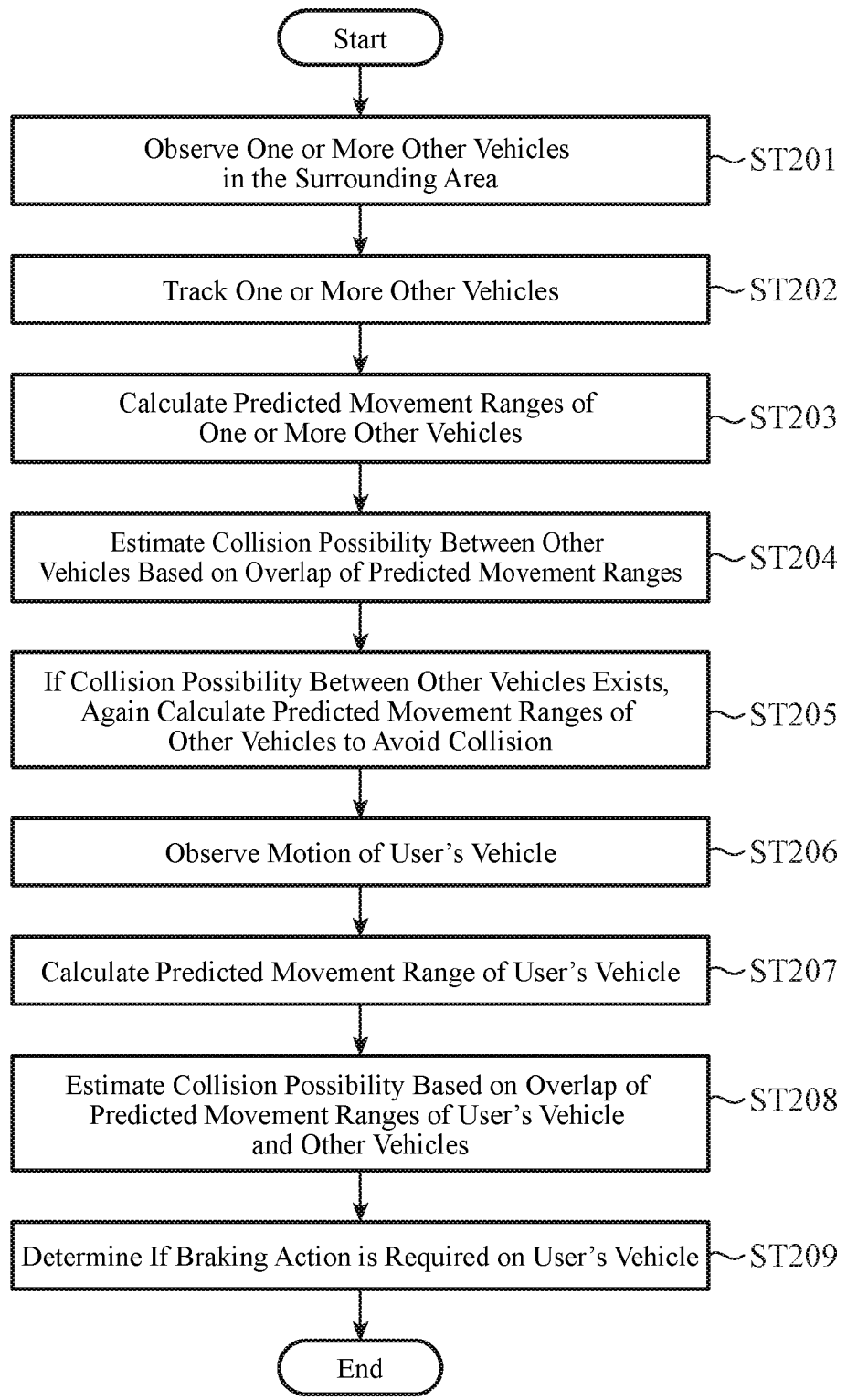
FIG. 2 is a flowchart illustrating a processing procedure of the collision avoidance device according to the first embodiment of the invention.

In the processing by the collision avoidance device, as illustrated in FIG. 2, the target observation sensor 1 first periodically performs observation of one or more other vehicles 60 existing around the user's vehicle 50 and calculates positions of the one or more other vehicles 60, based on the observation result (step ST201, target observation step). Information representing the observation result from the target observation sensor 1 (target observation value data) is output to and stored in the data storage 2 of target observation values.

Next, the target tracker 3 performs time series processing (tracking processing) of positions of one or more other vehicles 60 on the basis of the target observation value data stored in the data storage 2 of target observation values and thereby estimates more accurate positions and velocities of the other vehicles 60 (step ST202, target tracking step). That is, adding velocity information to static position information of the other vehicles 60 obtained by the target observation sensor 1 provides dynamic information, thereby allowing more accurate positions of the other vehicles 60 to be obtained. In the following, details of processing by the target tracker 3 will be described.

The target tracker 3 first reads information representing the observation result (observation value) as of the latest observation time from the target observation sensor 1. Next, a gate of a previously obtained track is calculated. Then, whether the read observation value is within the gate is examined, and which track the observation value can be associated with is determined. Here, a track has, as a quantity for estimation, a vector having four components of the following formula (1) which are the position and velocity of each vehicle 60 in the two-dimensional x-y space.

$$\underline{x}_k = (x_k, y_k, \dot{x}_k, \dot{y}_k)^T \tag{1}$$

Then, a predicted vector of the vehicle 60 as of the latest observation time k, $x_k$-hat(−), is calculated by the following formula (2).

$$\hat{x}^k(-) = \Phi_{k-1} \hat{x}_{k-1}(+) \tag{2}$$

Figure 3:
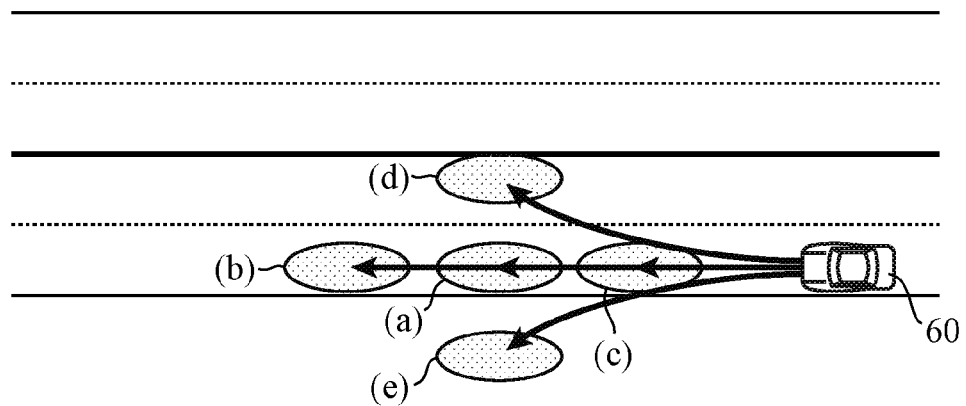
FIG. 3 is a diagram illustrating motion models of a vehicle of the collision avoidance device according to the first embodiment of the invention.

Here, we assume multiple motions of an automobile. FIG. 3 illustrates a case where five motion models ((a) a constant velocity model (staying in the current lane), (b) an acceleration model (staying in the current lane), (c) a deceleration model (staying in the current lane), (d) a model for a lane change to the right (a course change model), and (e) a model for a lane change to the left (a course change model)) are assumed to be applied for the motion of the vehicle 60. In the present embodiment, the automobile is assumed to take any one motion from among the above five motion models.

Incidentally, a "model for moving to a right lane or left lane with a deceleration (negative acceleration) or positive acceleration" may be added as the motion model.

Incidentally, the transition matrix $\Phi_{k-1}$ in the above formula (2) is set as a matrix corresponding to each of the motion models. For example in the case of the constant velocity model, the transition matrix $\Phi_{k-1}$ is represented by the following formula (3).

$$\Phi_{k-1} = \begin{pmatrix} 1 & 0 & T & 0 \\ 0 & 1 & 0 & T \\ 0 & 0 & 1 & 0 \\ 0 & 0 & 0 & 1 \end{pmatrix} \tag{3}$$

Here, T represents a sampling interval (time elapsed from a preceding observation time by the target observation sensor 1 to the present time). Also, $x_{k-1}$-hat(+) represents an estimated vector as of the preceding observation time.

Moreover, a prediction error covariance matrix $P_k(-)$ is calculated by the following formula (4).

$$P_k(-) = \Phi_{k-1} P_{k-1}(+) \Phi_{k-1}^T + Q_{k-1} \tag{4}$$

Here, $P_{k-1}(+)$ represents an estimation error covariance matrix as of one observation time prior. Furthermore, $Q_{k-1}$ represents a process noise covariance matrix, which is represented by the following formula (5).

$$Q_{k-1} = \begin{bmatrix} \frac{T^3}{3} I_{2\times 2} & \frac{T^2}{2} I_{2\times 2} \\ \frac{T^2}{2} I_{2\times 2} & T I_{2\times 2} \end{bmatrix} q \tag{5}$$

Here, q represents a preset parameter of power spectral density and $I_{2\times2}$ represents a unit matrix of two rows and two columns.

Thereafter, a residual covariance matrix $S_k$ is calculated according to the following formula (6).

$$S_k = H_k P_k(-) H_k^T + \Gamma_2(k) R_k \Gamma_2^T(k) \qquad (6)$$

Here, $H_k$ represents an observation matrix, $R_k$ represents an observation error covariance matrix of the target observation sensor 1, and $\Gamma_2(k)$ represents a conversion matrix of observation noise. Each of the above representations is represented by the following formulas (7) to (9), respectively, when the observation value vector is obtained as values on a polar coordinate of distance and azimuth angle.

$$H_k = [\, I_{2\times 2} \quad 0_{2\times 2}\,] \qquad (7)$$

$$\Gamma_2(k) = \begin{pmatrix} \sin(By_k) & R_k \cos(By_k) \\ \cos(By_k) & -R_k \sin(By_k) \end{pmatrix} \qquad (8)$$

$$R_k = \begin{pmatrix} \sigma_R^2 & 0 \\ 0 & \sigma_{By}^2 \end{pmatrix} \qquad (9)$$

Here, $0_{2\times2}$ represents a matrix where all elements in two rows and two columns are zero. $\sigma_R$ represents a standard deviation of a distance observation error of the target observation sensor 1 and $\sigma_{By}$ represents a standard deviation of an azimuth angle observation error.

Determination on whether an observation value $z_k$ from the target observation sensor 1 is within the gate is performed using the residual covariance matrix $S_k$. This observation value $z_k$ is a vector obtained by converting observation information represented by a distance and azimuth angle into a position on Cartesian coordinates. Whether the value is within the gate is determined according to whether the following inequality (10) is satisfied or not.

$$(z_k - z_k(-))^T S_k^{-1} (z_k - z_k(-)) < d \qquad (10)$$

Here, $z_k(-)$ indicates a predicted observation value, which can be calculated by the following formula (11).

$$z_k(-) = H_k \hat{x}_k(-) \qquad (11)$$

d represents a parameter of boundary value defined by a significance level in a $\chi$ squared test.

When a reliability of a motion model as of a preceding sampling time is represented as $\beta_{k-1,b}(+)$ ($b \in \{(a),(b),(c),(d),(e)\}$), a reliability of a prediction model as of the present sampling time $\beta_{k,a}(-)$ ($a \in \{(a),(b),(c),(d),(e)\}$) is calculated by the following formula (12).

$$\beta_{k,a}(-) = \sum_{b=1}^{N} p_{k,ab} \beta_{k-1,b}(+) \qquad (12)$$

Here, $p_{k,ab}$ is a transition probability parameter representing a probability where the motion model transits from "b" to "a". These transition probability parameters can be represented as a matrix defining transitions of all combinations of "b" and "a".

This transition probability parameter $p_{k,ab}$ is usually set as, for example the following formula (15).

$$p_{k,ab} = \begin{pmatrix} 0.6 & 0.1 & 0.1 & 0.1 & 0.1 \\ 0.1 & 0.6 & 0.1 & 0.1 & 0.1 \\ 0.1 & 0.1 & 0.6 & 0.1 & 0.1 \\ 0.1 & 0.1 & 0.1 & 0.6 & 0.1 \\ 0.1 & 0.1 & 0.1 & 0.1 & 0.6 \end{pmatrix} \qquad (13)$$

In this example, the diagonal elements are 0.6 while the non-diagonal elements are 0.1. This shows that the probabilities to keep the present motion model are 0.6 while the probabilities to transit to other motion models are 0.1 for any transitions between those models. As a result, in such a stable situation as the vehicle 60 stays in the current lane, for example, a result of "the subsequent motion of the vehicle 60 comprised of: 80% for a constant velocity, 10% for an acceleration, 10% for a lane change to the right, and 0% for the others" is obtained. Thus the constant velocity model is selected and thereby a predicted movement range is set.

Incidentally, according to the degree of accuracy required for tracking, a filter for the above motion models performs a weighting mixture.

Thereafter, the estimated values of motion quantities as of the latest time along the track is calculated using the observation value determined as within the gate by the determination of the above formula (10) whether the value is within the gate. In this regard, when there exist multiple previously obtained tracks and a particular observation value is within gates of the multiple tracks, association determination processing for associating the observation value in one-to-one correspondence with the previously obtained tracks is required. Especially when the present invention is applied to an automobile, this association issue is important since other vehicles 60 exist around the user's vehicle 50 in many cases. Several methods to perform the association determination processing while creating hypotheses have been proposed to date (c.f. Patent reference 2, for example).

When the observation value is allotted to the previously obtained tracks by the association determination, estimation quantities as of an observation time of the tracks are calculated. For an updated track, likelihood of a track corresponding to the association result is further calculated. The estimated vector is calculated by the following formula (14).

$$\hat{x}_k(+) = \hat{x}_k(-) + K_k \{z_k - H_k \hat{x}_k(-)\} \qquad (14)$$

Here, $K_k$ is a filter gain, which can be calculated by the following formula (15).

$$K_k = P_k(-) H_k^T S_k^{-1} \qquad (15)$$

Moreover, an estimation error covariance matrix is calculated by the following formula (16).

$$P_k(+) = P_k(-) - K_k H_k^T P_k(-) \qquad (16)$$

Also, likelihood of a track is calculated by the following formula (17) assuming that a probability distribution of observation values forms a Gaussian distribution with a predicted position (two-dimensional position) as the center thereof.

$$g(z_k; z_k(-); S_k) = \frac{1}{(\sqrt{2\pi})^3} \exp\left(-\frac{1}{2}(z_k - z_k(-))^T S_k^{-1} (z_k - z_k(-))\right) \qquad (17)$$

A reliability of a model reflecting observation values is expressed by the following formula (18).

$$\beta_{k,a}(+) = \frac{\sum_{b=1}^{N} v_{k,a} p_{k,ab} \beta_{k-1,b}(+)}{\sum_{a=1}^{N} \sum_{b=1}^{N} v_{k,a} p_{k,ab} \beta_{k-1,b}(+)} \quad (18)$$

Here, $v_{k,a}$ represents likelihood of the motion model "a" calculated based on observation values, which is represented by the following formula (19).

$$v_{k,a} = g(z_k; z_{k,a}(-); S_k) \quad (19)$$

In the above manner, the estimated values of a position and velocity of the vehicle 60 in a selected motion model and the above estimated error covariance matrix are estimated for every tracking track. Such information (target tracking data) is output to and stored in the target tracking data storage 4 and used for determination on the possibility of steering by the target-motion prediction unit 5.

Next, the target-motion prediction unit 5 calculates predicted movement ranges of one or more other vehicles 60, based on the target tracking data stored in the target tracking data storage 4 (step ST203, target-motion prediction step). Here, the target-motion prediction unit 5 calculates predicted movement ranges in the future from the estimated values of positions and velocities of the other vehicles 60 and estimated error covariance matrices thereof. Prediction timings are multiple discrete times set with constant sampling intervals from the present time to completion of turning right. These sampling timings are completely set to be identical to sampling timings set in an own-motion prediction step, which will be described later.

Information representing the predicted movement ranges of the other vehicles 60, which is calculated by the target-motion prediction unit 5, is output to the inter-target collision possibility estimator 6.

Figure 4:
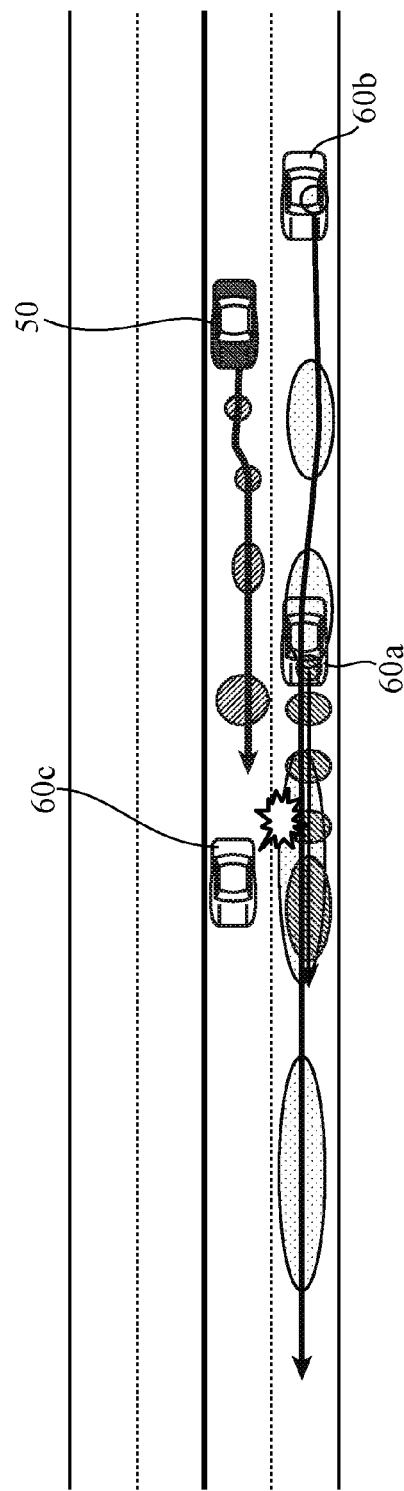
FIG. 4 is a diagram illustrating a case of possible collision between other vehicles.

Next, when multiple other vehicles 60 exist, the inter-target collision possibility estimator 6 estimates a collision possibility between these other vehicles 60, based on overlap between predicted movement ranges of those other vehicles 60, calculated by the target-motion prediction unit (step ST204, inter-target collision possibility estimation step). Here, the collision possibility is estimated for every combination of the surrounding other vehicles 60 observed by the user's vehicle 50. For example, if a situation around the user's vehicle 50 is as illustrated in FIG. 4 (if three other vehicles 60a to 60c exist), collision possibilities are estimated for three different combinations: a combination of the vehicles 60a and 60b, a combination of the vehicles 60b and 60c, and a combination of the vehicles 60a and 60c.

Estimation of a collision possibility is performed according to whether the following formula (20) is satisfied or not. If the formula (20) is satisfied, collision is estimated to occur for that specific combination.

$$M(x_{p,1,k}(-); P_{p,1,k}(-); x_{p,2,k}(-); P_{p,2,k}(-)) < \text{threshold}_c \quad (20)$$

Here, $\text{threshold}_c$ on the right side is a preset threshold parameter. The left side represents the probability that two other vehicles 60 in the combination exist at the same position and is an integral, over the entire positional space, of a simultaneous existence probability density at a specific position of those other vehicles 60 as represented by the following formula (21).

An approximation for the formula (20) can be made by numerical calculation of the following formula (21).

$$M(x_{p,1,k}(-); P_{p,1,k}(-); x_{p,2,k}(-); P_{p,2,k}(-)) \equiv \quad (21)$$
$$\int\int \frac{1}{(2\pi)^2} \exp\left(-\frac{1}{2}(x - x_{p,1,k}(-))^T P_{p,1,k}(-)^{-1}(x - x_{p,1,k}(-))\right) \cdot$$
$$\exp\left(-\frac{1}{2}(x - x_{p,2,k}(-))^T P_{p,2,k}(-)^{-1}(x - x_{p,2,k}(-))\right) dxdy$$

$$(x \equiv (x \ y))$$

where $x_{p,1,k}(-)$ and $P_{p,1,k}(-)$ represent the predicted center and its covariance matrix, respectively, for one of the vehicles 60, and $x_{p,2,k}(-)$ and $P_{p,2,k}(-)$ represent the predicted center and its covariance matrix, respectively, for another one of the vehicles 60.

This is the achievement of the object by applying, as it is, estimation of the collision possibility represented by overlap of predicted ellipses between the user's vehicle 50 and another vehicle 60 of the related art, to estimation of a collision possibility between other vehicles 60. In the example of FIG. 4, other vehicles 60a and 60b exist on a lane adjacent to the user's vehicle 50, and the following vehicle 60b is presently travelling faster. Here, the center of an ellipse in the figure represents a predicted position of movement, and the area of an ellipse represents a standard deviation of a prediction error covariance matrix. In this case, it is estimated, from overlap between the predicted ellipses, that the vehicle 60b collides with the vehicle 60a.

Information representing the collision possibility between other vehicles 60 from the inter-target collision possibility estimator 6 is output to the target-motion re-prediction unit 7.

Next, the target-motion re-prediction unit 7 again calculates, when the inter-target collision possibility estimator 6 estimates possible collision between other vehicles 60, predicted movement ranges of the vehicles 60 to avoid collision (step ST205, target-motion re-prediction step). In the following, it is assumed that an action to avoid collision is taken by a following vehicle (e.g., the vehicle 60b in the example of FIG. 4) in which a driver can easily become aware of another vehicle by the driver's visual attention. A case of modifying the predicted movement ranges will be described.

Upon modifying a predicted movement range, re-prediction is performed by selecting a motion model which does not cause collision. This re-prediction is implemented by adjusting a transition probability among the motion models according to whether there is a possible collision with other vehicles 60, and removing the motion model where collision occurs.

Figure 5:
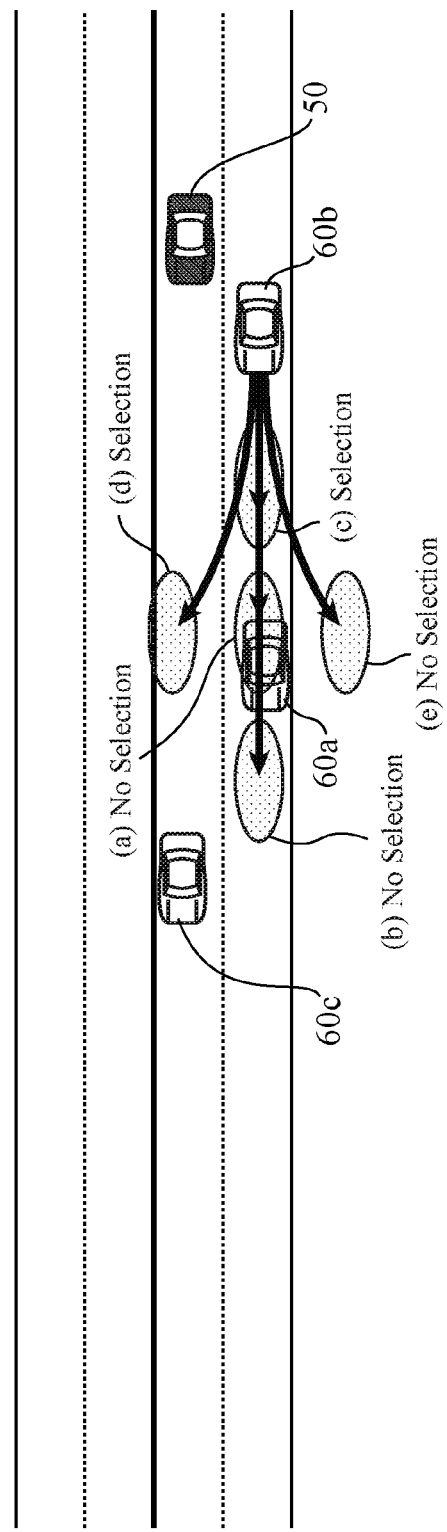
FIG. 5 is a diagram illustrating selections of motion models of one of other vehicles undergoing re-prediction by the collision avoidance device according to the first embodiment of the invention.

For the example in FIG. 4, criteria for selecting a motion model of the vehicle 60b are as illustrated in FIG. 5, which reflect an action to avoid collision. That is, (a) the constant velocity model (staying in the current lane) is not selected due to collision with the vehicle 60a. Also, (b) the acceleration model (staying in the current lane) is not selected due to collision with the vehicle 60a. Meanwhile, (c) the deceleration model (staying in the current lane) is selected as a candidate. (d) The model for a lane change to the right is selected as another candidate. (e) The model for a lane change to the left is not selected since there is no lane at the left.

As a result, the motion model selectable for the vehicle 60b is either the deceleration model or the model for a lane change to the right as illustrated in FIG. 5.

Means to calculate a selection of a motion model in the above manner include control of a transition probability parameter $p_{k,ab}$. While a result of motion model selection of "80% for a constant velocity, 10% for an acceleration, 10% for a lane change to the right, and 0% for the others" is obtained in an ordinary motion model reliability calculation, a result of "40% for deceleration, 60% for a lane change to the right, and 0% for the others" is desired. That is, model probability parameters are changed from ordinary ones to the following formula (22).

$$p_{k,ab} = \begin{pmatrix} 0.0 & 0.0 & 0.0 & 0.0 & 0.0 \\ 0.0 & 0.0 & 0.0 & 0.0 & 0.0 \\ 0.3 & 0.3 & 0.3 & 0.3 & 0.3 \\ 0.6 & 0.6 & 0.6 & 0.6 & 0.6 \\ 0.0 & 0.0 & 0.0 & 0.0 & 0.0 \end{pmatrix} + \begin{pmatrix} 0.1 & 0.0 & 0.0 & 0.0 & 0.0 \\ 0.0 & 0.1 & 0.0 & 0.0 & 0.0 \\ 0.0 & 0.0 & 0.1 & 0.0 & 0.0 \\ 0.0 & 0.0 & 0.0 & 0.1 & 0.0 \\ 0.0 & 0.0 & 0.0 & 0.0 & 0.1 \end{pmatrix} \quad (22)$$

The first term on the right side is a matrix for weight ratios to transit to either (c) the deceleration model or (d) the model for a lane change to the right, where the weight ratios to (c) the deceleration model and (d) the model for a lane change to the right are set as $\alpha:\beta=0.3:0.6$.

A determination method of these weight parameters ($\alpha$ and $\beta$ in the above formula) to (c) the deceleration model and (d) the model for a lane change to the right will be described. One criterion is that "how large the margin of" the distance between the vehicle 60b and a preceding vehicle that is the closest to the vehicle 60b for each lane (where the preceding vehicle is the vehicle 60a on the left lane, or the vehicle 60c on the right lane) "exists with respect to a relative velocity". One example is determined according to ratios between relative distances and relative velocities as expressed by the following formula (23).

$$\alpha:\beta = \frac{R_{12}}{\Delta V_{12}} : \frac{R_{23}}{\Delta V_{23}} \quad (23)$$

$$\Delta V_{12} \equiv V_2 - V_1, \Delta V_{23} \equiv V_2 - V_3$$

Figure 6:
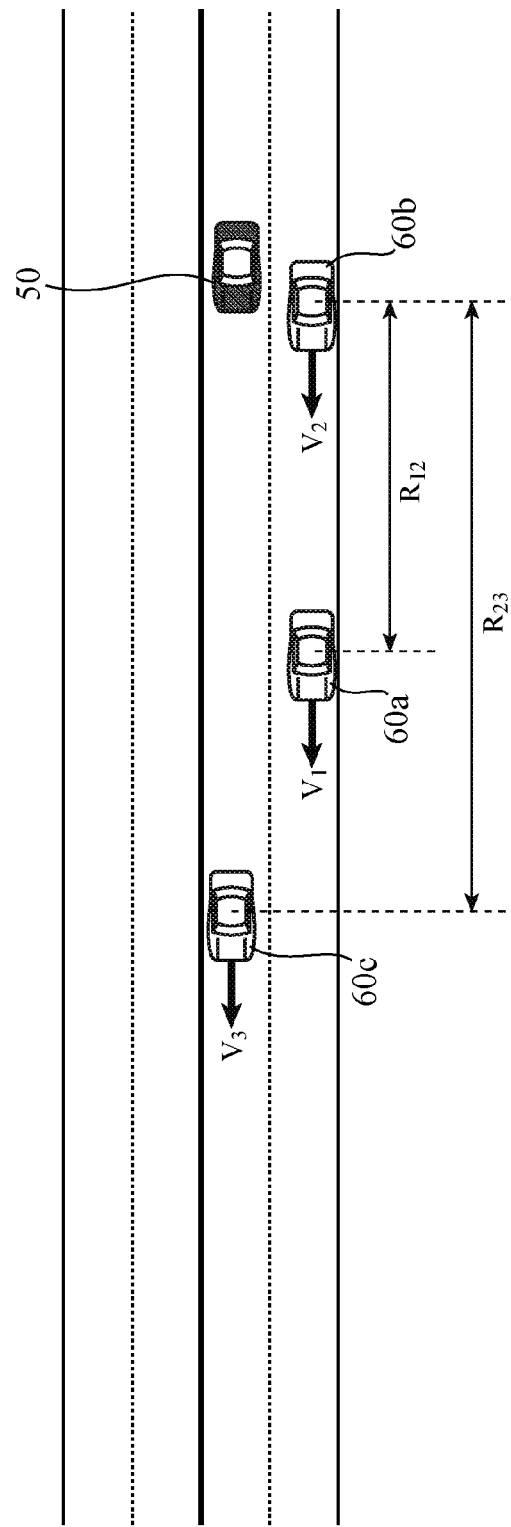
FIG. 6 is a diagram illustrating exemplary relative motions of other vehicles.

Here, $V_1$ represents a velocity of the vehicle 60a, $V_2$ represents a velocity of the vehicle 60b, $V_3$ represents a velocity of the vehicle 60c, $R_{12}$ represents a distance between the vehicles 60a and 60b, and $R_{23}$ represents a distance between the vehicles 60c and 60b (cf. FIG. 6).

Note that in the above the weight parameters are calculated from a relative distance and relative velocity between an automobile and a front vehicle thereof on each lane, where a method to calculate from a relative distance and relative velocity between an automobile and front and rear vehicles thereof on each lane may be employed. Alternatively, not with a ratio between a relative distance and relative velocity but a ratio between relative distances may simply be use as the weight parameter.

In the above, upon a selection of a motion performed by the vehicle 60 to avoid collision, a case where assigning a weight to the motion (calculation of weight parameters) is performed according to a state of open space around the vehicle 60 is described. In this regard, assigning the weight to the motion is not limited thereto but may be performed in such a manner as to, for example, allow the vehicle 60 to stay in the current lane and to prioritize a rectilinear motion. Here, a probability measure for the vehicle 60 to stay in the current lane is defined as a preset parameter value $\gamma$ or more and thereby the weight parameters are calculated from the following formula (24).

$$\alpha:\beta = \frac{R_{12}}{\Delta V_{12}} + \gamma : \frac{R_{23}}{\Delta V_{23}} \quad (24)$$

Figure 7:
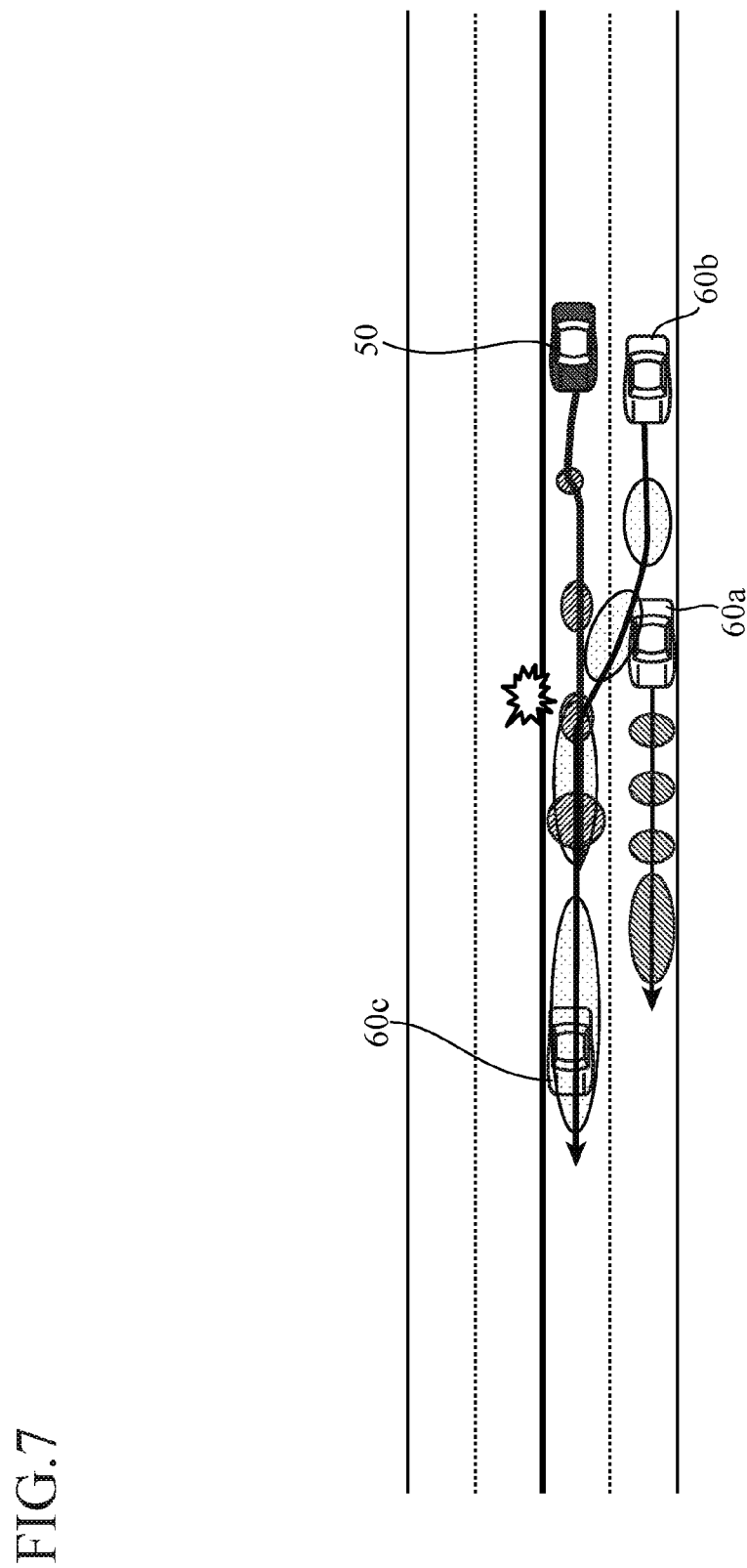
FIG. 7 is a diagram illustrating an exemplary predicted course re-predicted by the collision avoidance device according to the first embodiment of the invention.

An exemplary re-calculation result of the predicted movement range of other vehicles 60 by the above processing is illustrated in FIG. 7. Information representing the predicted movement ranges of the vehicles 60 calculated again by the target-motion re-prediction unit 7 is output to the own-collision possibility estimator 11. Incidentally, when the inter-target collision possibility estimator 6 estimates no collision possibility between the vehicles 60, or when two or more vehicles 60 do not exist, information representing the predicted movement ranges of the vehicles 60, which is calculated by the target-motion prediction unit 5, is output to the own-collision possibility estimator 11 as it is.

Meanwhile, the own-motion sensor 8 observes motion quantities that include a position and velocity of the user's vehicle 50 (step ST206, own-motion observation step). Information representing an observation resulting from the own-motion sensor 8 (own motion data) is output to and stored in the own-motion data storage 9.

Next, the own-motion prediction unit 10 predicts a position and velocity in the future of the user's vehicle 50, based on the own-motion data stored in the own-motion data storage 9, and calculates a predicted movement range of the user's vehicle 50 using a prediction error covariance matrix thereof (step ST207, own-motion prediction step). Incidentally, prediction timings are multiple discrete times set with constant sampling intervals from the present time and on. In the following, a number of sampling timings of the future prediction time is defined as k.

Here, the motion of the user's vehicle 50 at each sampling time is represented as a vector having four components of the following formula (25) including a position and velocity of the user's vehicle 50 in the two-dimensional x-y space.

$$\underline{u}_k = (x_k, y_k, \dot{x}_k, \dot{y}_k)^T \quad (25)$$

As for the estimated value of the motion of the user's vehicle 50 as of the present time, the position is self-motion information obtained from an in-vehicle sensor or other sensor such as a GPS sensor. A predicted position in the future of the user's vehicle 50 is calculated by the following formula (26):

$$\hat{u}_{f,k}(-) = \Phi_{uf,k}\hat{u}_{f,k}(+) \quad (26)$$

where $\Phi_{uf,k}$ is represented by the following formula (27) with a premise of the constant velocity motion of the user's vehicle 50.

$$\Phi_{uf,k} = \begin{pmatrix} 1 & 0 & T_p & 0 \\ 0 & 1 & 0 & T_p \\ 0 & 0 & 1 & 0 \\ 0 & 0 & 0 & 1 \end{pmatrix} \quad (27)$$

Here, $T_p$ represents a sampling interval in future prediction processing.

Moreover, a future prediction error covariance matrix $P_{uf,k}(-)$ is calculated by the following formula (28):

$$P_{uf,k}(-) = \Phi_{uf,k-1}P_{uk-1}(+)\Phi_{uf,k-1}^T + Q_{uf,k} \quad (28)$$

where $P_{uf,k}(+)$ represents an estimated error covariance matrix with respect to motion quantities of the user's vehicle 50 as of the present time, which is calculated by extrapolating from a latest estimation error covariance matrix. Furthermore, $Q_{uf,k}$ represents a process covariance matrix, which is represented by the following formula (29).

$$Q_{uf,k} = \begin{bmatrix} \dfrac{T_p^3}{3} I_{2\times 2} & \dfrac{T_p^2}{2} I_{2\times 2} \\ \dfrac{T_p^2}{2} I_{2\times 2} & T_p I_{2\times 2} \end{bmatrix} q \qquad (29)$$

An exemplary calculation result of the predicted movement range of the user's vehicle 50 by the above processing is illustrated in FIG. 7. Information representing the predicted movement range of the user's vehicle 50 calculated by the own-motion prediction unit 10 is output to the own-collision possibility estimator 11.

Next, the own-collision possibility estimator 11 estimates collision possibilities between the user's vehicle and other vehicles 60, based on overlap between the predicted movement range of the user's vehicle 50 calculated by the own-motion prediction unit 10 and the predicted movement ranges of the vehicles 60 with no collision possibility between the vehicles 60, calculated by the target-motion prediction unit 5 or target-motion re-prediction unit 7 (step ST208, own-collision possibility estimation step).

Specifically, the estimation of the collision possibility is performed according to whether the following formula (30) is satisfied or not. If the following formula (30) is satisfied, possible collision between the user's vehicle 50 and the vehicle 60 is estimated to occur.

$$M(x_{uf,k}(-); P_{uf,k}(-); x_{p,k}(-); P_{p,k}(-)) < \text{threshold}_M \qquad (30)$$

Here, threshold$_M$ on the right side is a preset threshold parameter. The left side represents the probability that the user's vehicle 50 and the vehicle 60 exist at the same position and is an integral, over the entire positional space, of a simultaneous existence probability density at a specific position of the user's vehicle 50 and the vehicle 60 as represented by the following formula (31). This can be approximated by numerical calculation.

$$M(\hat{u}_{f,k}(-); P_{uf,k}(-); \hat{x}_{f,k}(-); P_{f,k}(-)) \equiv \qquad (31)$$

$$\int\int \dfrac{1}{(2\pi)^2} \exp\!\left(-\dfrac{1}{2}(x - \hat{u}_{f,k}(-))^T P_{uf,k}(-)^{-1}(x - \hat{u}_{f,k}(-))\right) \cdot$$

$$\exp\!\left(-\dfrac{1}{2}(x - \hat{x}_{f,k}(-))^T P_{f,k}(-)^{-1}(x - \hat{x}_{f,k}(-))\right) dx dy$$

$$(x \equiv (x \;\; y))$$

Information representing the collision possibility between the user's vehicle 50 and the vehicle 60 estimated by the own-collision possibility estimator 11 is output to the braking determination unit 12.

Next, the braking determination unit 12 determines if braking is required on the user's vehicle 50, based on the estimation result from the own-collision possibility estimator 11 (step ST209, braking determination step). When the own-collision possibility estimator 11 estimates the collision possibility between the user's vehicle 50 and the vehicle 60 and the braking determination unit 12 determines that braking of the user's vehicle 50 is required, the automatic braking system 13 executes a deceleration function of the user's vehicle 50 by automatic braking, and alternatively, the warning generator 14 shows a message or produces an audio output to convey, to a driver of the user's vehicle 50, that brake operation is required at the present time.

Repeating the above processing periodically allows a collision avoidance response of the user's vehicle 50 all the time.

As described above, the first embodiment is configured to observe one or more other vehicles 60 around the user's vehicle 50, to estimate a collision possibility between the vehicles 60, and to re-predict the motions of the vehicles 60 to avoid collision when there is the collision possibility, thus allowing the detection of the motions of the multiple other vehicles 60 and improvement of the accuracy in motion prediction. This makes it possible to obtain the collision avoidance device capable of detecting earlier the possibility that the vehicle 60 may intrude into the lane where the user's vehicle 50 exists, based on the relative motions of the multiple other vehicles 60, thereby allowing an response at an early phase.

Second Embodiment

In the first embodiment, a case where the number of models for lane-change (course change models) of other vehicles 60 is constant is described. In a second embodiment, a case where one or more start times of lane changes are set depending on the positions and velocities between other vehicles 60, thereby allowing the number of models for lane changes to be variable.

Figure 8:
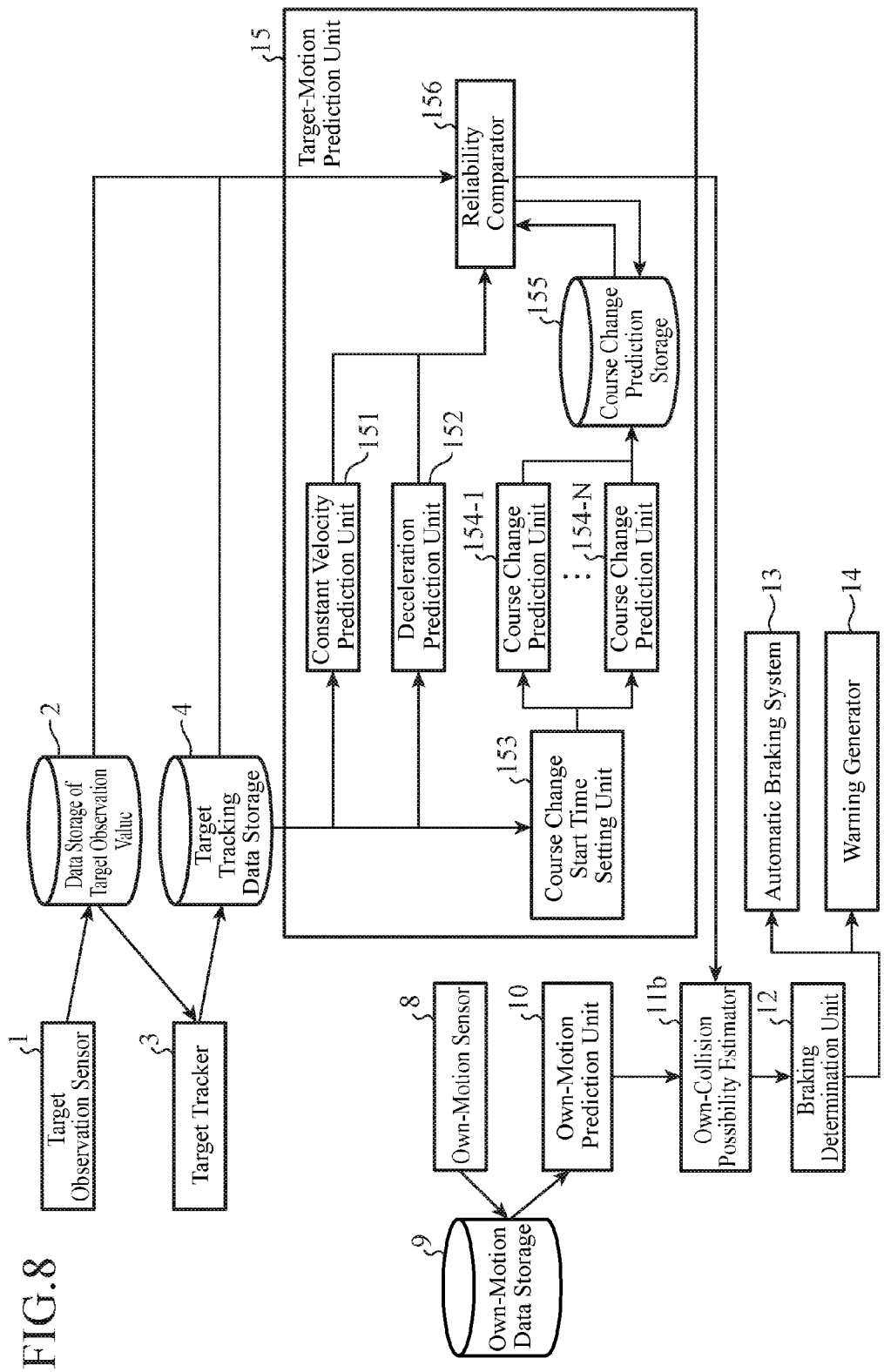
FIG. 8 is a block diagram illustrating a configuration of a collision avoidance device according to a second embodiment of the invention.

FIG. 8 is a diagram illustrating a configuration of a collision avoidance device according to the second embodiment of the invention. The collision avoidance device according to the second embodiment illustrated in FIG. 8 is removed of the target-motion prediction unit 5, inter-target collision possibility estimator 6, and target-motion re-prediction unit 7 of the collision avoidance device according to the first embodiment illustrated in FIG. 1 while added with a target-motion prediction unit 15. Other configurations are similar and thus denoted with the same symbols while only different points are described.

In the first Embodiment, the target tracker 3 performs tracking of one or more other vehicles 60 under the assumption that multiple motion models for each vehicle 60 are applied. Contrary to this, the target tracker 3 of the second embodiment assumes a constant velocity model (staying in the current lane) as a motion model.

The target-motion prediction unit 15 sets a motion model from the positions and velocities of one or more other vehicles 60 on the basis of the target tracking data stored in the target tracking data storage 4, and calculates predicted movement ranges of the other vehicles 60 and reliabilities of the predicted movement ranges. Here, the reliability is an index representing the possibility that the movement of each vehicle 60 toward a predicted movement range may occur. In the following, the target-motion prediction unit 15 further calculates, based on the calculated reliability, a relative reliability which is an index representing a relative reliability of respective predicted movement ranges and lists the predicted movement ranges and relative reliabilities. The target-motion prediction unit 15 further deletes information representing an unnecessary predicted movement range in accordance with the target observation value data stored in the data storage 2 of target observation values. This target-motion prediction unit 15 includes a constant velocity prediction unit 151, deceleration prediction unit 152, course change start time setting unit 153, multiple course change prediction units 154 (154-1 to 154-N), course change prediction storage 155, and reliability comparator 156.

The constant velocity prediction unit 151 assumes that a constant velocity model (staying in the current lane) is applied as the motion model of the vehicle 60, and calculates a predicted movement range (predicted movement range for a constant velocity) of the vehicle 60, based on the target tracking data stored in the target tracking data storage 4. Information representing the predicted movement range of the vehicle 60, which is calculated by the constant velocity prediction unit 151, is output to the reliability comparator 156.

The deceleration prediction unit 152 assumes that a deceleration model (staying in the current lane) is applied as the motion model of the vehicle 60, and calculates a predicted movement range (predicted movement range with deceleration) of the vehicle 60, based on the target tracking data stored in the target tracking data storage 4. Information representing the predicted movement range of the vehicle 60, which is calculated by the deceleration prediction unit 152, is output to the reliability comparator 156.

Based on the target tracking data stored in the target tracking data storage 4, the course change start time setting unit 153 sets one or more start times of lane changes (start times for course changes) in models for the lane changes of other vehicles 60, depending on the positions and velocities between the vehicles 60. Information representing the start times of lane changes, which are set by the course change start time setting unit 153, is output to the corresponding course change prediction unit 154.

The course change prediction unit 154 assumes that models for lane changes are applied as the motion models of one or more other vehicles 60, and calculates predicted movement ranges (predicted movement ranges for lane changes) of the vehicles 60, in accordance with the corresponding start times of lane changes which have been set by the course change start time setting unit 153. Information representing the predicted movement ranges of the vehicles 60, which is calculated by the course change prediction unit 154, is output to the course change prediction storage 155.

The course change prediction storage 155 stores information representing the predicted movement ranges of one or more other vehicles 60 calculated by each of the course change prediction units 154. The course change prediction storage 155 is configured by HDDs, DVDs, memories, or the like.

The reliability comparator 156 calculates a reliability of each of the predicted movement ranges of one or more other vehicles 60 calculated based on the target tracking data stored in the target tracking data storage 4 by each of the prediction units 151, 152, and 154, then calculates their respective relative reliabilities, and generates a list of the relative reliabilities. The reliability comparator 156 further deletes information representing an unnecessary predicted movement range in the course change prediction storage 155 on the basis of the target observation value data stored in the data storage 2 of target observation values. The list showing the respective predicted movement ranges of the one or more other vehicles 60 and relative reliabilities thereof obtained by the reliability comparator 156 is output to an own-collision possibility estimator 11b.

The own-collision possibility estimator 11b estimates collision possibilities between the user's vehicle 50 and one or more other vehicles 60, based on overlap between the predicted movement range of the user's vehicle 50 calculated by the own-motion prediction unit 10 and the predicted movement range of each vehicle 60 present in the list obtained by the target-motion prediction unit 15, as well as based on the reliability (relative reliability) of the predicted movement range of each vehicle 60 present in the list. Information representing the collision possibilities between the user's vehicle 50 and the one or more other vehicles 60, which is estimated by the own-collision possibility estimator 11b, is output to the braking determination unit 12.

Next, a flow of processing by a collision avoidance device configured in the above manner will be described with reference to FIGS. 9 to 13.

In the processing by the collision avoidance device according to the second embodiment, as illustrated in FIG. 9, the target observation sensor 1 first periodically performs observation of one or more other vehicles 60 existing around the user's vehicle 50 and calculates a position of each vehicle 60 from an observation result therefrom (step ST901, target observation step). Information representing the observation result from the target observation sensor 1 (target observation value data) is output to and stored in the data storage 2 of target observation values.

Next, the target tracker 3 performs time series processing (tracking processing) of positions of one or more other vehicles 60 on the basis of target observation value data stored in the data storage 2 of target observation values, thereby estimating more accurate positions and velocities of the one or more other vehicles 60 (step ST902, target tracking step). That is, adding velocity information to static position information of each vehicle 60 obtained by the target observation sensor 1 provides dynamic information, thereby allowing more accurate position of the vehicle 60 to be obtained. In the following, details of processing by the target tracker 3 will be described.

The target tracker 3 first reads information representing the observation result (observation value) as of the latest observation time from the target observation sensor 1. Next, a gate of a previously obtained track is calculated. Then, whether the read observation value is within the gate is examined, and which track the observation value can be associated with is determined. Here, a track has, as quantities for estimation, a vector having four components of the above formula (1) which are the position and velocity of the vehicle 60 in the two-dimensional x-y space.

A predicted vector of the vehicle 60 as of the latest observation time k, $x_k\text{-hat}(-)$, is calculated by the above formula (2).

Also, a transition matrix $\Phi_{k-1}$ in the above formula (2) assumes the constant velocity model as the motion model of the vehicle 60 in the second embodiment and is represented by the above formula (3).

Moreover, a prediction error covariance matrix $P_k(-)$ is calculated by the above formula (4) and the process covariance matrix $Q_{k-1}$ is represented by the above formula (5).

Thereafter, a residual covariance matrix $S_k$ is calculated according to the above formula (6). Note that when a vector of an observation value is obtained by values on a polar coordinate of distance and azimuth angle, an observation matrix $H_k$ in the formula (6), conversion matrix of observation noise $\Gamma_2(k)$, and observation error covariance matrix $R_k$ of the target observation sensor 1 are represented by the above formulas (7) to (9), respectively.

Determination on whether an observation value $z_k$ from the target observation sensor 1 is within the gate is performed using the residual covariance matrix $S_k$. This observation value $z_k$ is a vector obtained by converting observation information represented by a distance and azimuth angle into a position on Cartesian coordinates. Whether the value is within the gate is determined according to whether the above inequality (10) is satisfied or not. Incidentally, a prediction observation value $z_k(-)$ in the inequality (10) can be calculated by the above formula (11).

Thereafter, the estimated values of motion quantities as of the latest time along the track is calculated using the observation value determined as within the gate by the determination of the inequality (10) as to whether the value is within the gate. In this regard, when multiple previously obtained tracks exist and a particular observation value is within gates of the multiple tracks, association determination processing for associating the observation values in one-to-one correspondence with the previously obtained tracks is required. Especially when the present invention is applied to an automobile, this association issue is important since multiple other vehicles 60 exist around the user's vehicle 50 in many cases. Several methods to determine this association while multiple hypotheses are generated have been proposed to date (c.f. Patent reference 2, for example).

When the observation values are then allotted to the previously obtained tracks by the association determination, these tracks are updated with the observation values and an estimated vector is calculated. The estimated vector is calculated by the above formula (14). Incidentally, the filter gain $K_k$ in the formula (14) can be calculated by the above formula (15).

Moreover, an estimation error covariance matrix is calculated by the above formula (16).

In the above manner, the estimated values of a position and velocity of the vehicle 60 and an estimated error covariance matrix of the above are estimated for every tracking track. Such information (target tracking data) is output to and stored in the target tracking data storage 4 and used by the target-motion prediction unit 15.

Next, the constant velocity prediction unit 151 assumes that a constant velocity model (staying in the current lane) is applied as the motion models of one or more other vehicles 60, and calculates a predicted movement range (predicted movement range for a constant velocity) of the one or more vehicles 60, based on the target tracking data stored in the target tracking data storage 4 (step ST903, constant velocity prediction step). That is, the constant velocity prediction unit 151 estimates positions at respective sampling timings over a period from the present time to a maximum prediction time of S seconds later, under the assumption that each vehicle 60 maintains an estimated velocity as of the present time. In the following, details of processing by the constant velocity prediction unit 151 will be described.

The constant velocity prediction unit 151 first calculates a predicted vector $x^{(ConstVel)}_{k,m}(-)$ of a predicted movement range for a constant velocity of the vehicle 60 in the period from the present time k to m seconds later by the following formula (32).

$$x_{k,m}^{(ConstVel)}(-)=\Phi_{k,m-1}^{(ConstVel)}x_{k,m-1}^{(ConstVel)}(-) \quad (32)$$

Here, $\Phi^{(ConstVel)}_{k,m-1}$ is represented by the following formula (33).

$$\Phi_{k,m-1}^{(ConstVel)} = \begin{pmatrix} 1 & 0 & T_p & 0 \\ 0 & 1 & 0 & T_p \\ 0 & 0 & 1 & 0 \\ 0 & 0 & 0 & 1 \end{pmatrix} \quad (33)$$

Here, $T_p$ represents a sampling interval from the present time to the future.

Incidentally, initial values of the predicted vector of the predicted movement range for a constant velocity are represented by the following formula (34).

$$x_{k,0}^{(ConstVel)}(-)=\hat{x}_k(+) \quad (34)$$

Moreover, a prediction error covariance matrix of the predicted movement range for a constant velocity is calculated by the following formula (35).

$$P_{k,m}^{(ConstVel)}(-)=\Phi_{k,m-1}^{(ConstVel)}P_{k,m-1}^{(ConstVel)}(-)(\Phi_{k,m-1}^{(ConstVel)})^T+Q_{k,m-1} \quad (35)$$

Here, $Q_{k,m-1}$ represents a process covariance matrix, which is represented by the following formula (36).

$$Q_{k,m-1} = \begin{pmatrix} \frac{T_p^3}{3}I_{2\times2} & \frac{T_p^2}{2}I_{2\times2} \\ \frac{T_p^2}{2}I_{2\times2} & T_p I_{2\times2} \end{pmatrix} q \quad (36)$$

Here, q represents a preset parameter of power spectral density and $I_{2\times2}$ represents a unit matrix of two rows and two columns.

Incidentally, initial values of the prediction error covariance matrix of the predicted movement range for a constant velocity are represented by the following formula (37).

$$P_{k,0}^{(ConstVel)}(-)=P_k(+) \quad (37)$$

In the above manner, the predicted movement ranges until S seconds later when the vehicle 60 takes a rectilinear motion at a constant velocity and prediction error covariance matrix are calculated for every tracking track. The above information is output to the reliability comparator 156 and used for calculation of the possibility that the vehicle 60 takes a rectilinear motion at a constant velocity.

Next, the deceleration prediction unit 152 assumes that a deceleration model (staying in the current lane) is applied as the motion model of the vehicle 60, and calculates a predicted movement range (predicted movement range with deceleration) of the vehicle 60, based on the target tracking data stored in the target tracking data storage 4 (step ST904, deceleration prediction step). That is, the deceleration prediction unit 152 estimates positions at respective sampling timings over a period from the present time to a maximum prediction time of S seconds later, under the assumption that the vehicle 60 moves with deceleration from the present time. In the following, details of processing by the deceleration prediction unit 152 will be described.

The deceleration prediction unit 152 first calculates a predicted vector $x^{(Brake)}_{k,m}(-)$ of a predicted movement range with deceleration of the vehicle 60 from the present time k to m seconds later by the following formula (38).

$$x_{k,m}^{(Brake)}(-)=\Phi_{k,m-1}^{(Brake)}x_{k,m-1}^{(Brake)}(-)+a_{k,m-1}^{(Brake)} \quad (38)$$

Here, $\Phi^{(Brake)}_{k,m-1}$ and $a^{(Brake)}_{k,m-1}$ are represented by the following formulas (39) and (40).

$$\Phi_{k,m-1}^{(Brake)} = \begin{pmatrix} 1 & 0 & T_p & 0 \\ 0 & 1 & 0 & T_p \\ 0 & 0 & 1 & 0 \\ 0 & 0 & 0 & 1 \end{pmatrix} \quad (39)$$

$$a_{k,m-1}^{(Brake)} = \begin{pmatrix} 0 & \frac{T_p^2}{2} & 0 & T_p \end{pmatrix}^T \alpha \quad (40)$$

Here, $T_p$ represents a sampling interval from the present time to the future and $\alpha$ is a negative scalar quantity representing a preset negative acceleration.

Incidentally, initial values of the predicted vector of the predicted movement range with deceleration is represented by the following formula (41).

$$x_{k,0}^{(Brake)}(-) = \hat{x}_k(+) \qquad (41)$$

Moreover, a prediction error covariance matrix of the predicted movement range with deceleration is calculated by the following formula (42).

$$P_{k,m}^{(Brake)}(-) = \Phi_{k,m-1}^{(Brake)} P_{k,m-1}^{(Brake)}(-) (\Phi_{k,m-1}^{(Brake)})^T + Q_{k,m-1} \qquad (42)$$

Here, $Q_{k,m-1}$ represents a process covariance matrix, which is represented by the following formula (43).

$$Q_{k,m-1} = \begin{pmatrix} \frac{T_p^3}{3} I_{2\times 2} & \frac{T_p^2}{2} I_{2\times 2} \\ \frac{T_p^2}{2} I_{2\times 2} & T_p I_{2\times 2} \end{pmatrix} q \qquad (43)$$

Here, q represents a preset parameter of power spectral density and $I_{2\times 2}$ represents a unit matrix of two rows and two columns.

Incidentally, initial values of the prediction error covariance matrix of the predicted movement range with deceleration is represented by the following formula (44).

$$P_{k,0}^{(Brake)}(-) = P_k(+) \qquad (44)$$

In the above manner, the predicted movement ranges until S seconds later when the vehicle 60 decelerates and prediction error covariance matrix are calculated for every tracking track. The above information is output to the reliability comparator 156 and used for calculation of the possibility that the vehicle 60 decelerates.

Next, the course change start time setting unit 153 sets one or more start times of lane changes in models for lane changes of each of the vehicles 60, depending on the positions and velocities between the vehicles 60, based on the target tracking data stored in the target tracking data storage 4 (step ST905, course change start time setting step). In the following, details of processing by the course change start time setting unit 153 will be described. Here, with an example of FIGS. 10(*a*) and 10(*b*), a case where a start time of lane changes of one vehicle 60*b* is set according to a positional relation and relative velocity relative to another vehicle 60*a* positioned in front thereof. Note that FIG. 10(*a*) illustrates a case where the vehicle 60*b* changes to a right lane after confirming a situation of the right lane while FIG. 10(*b*) illustrates a case where the vehicle 60*b* prioritizes avoiding collision with the vehicle 60*a* and abruptly changes to the right lane.

As one of means to set selectable start times of lane changes when the vehicle 60*b* changes lanes, a method of using a collision prediction time (TTC: Time To Collision) between the vehicles 60*b* and 60*a* will be described here. TTCs of the vehicles 60*b* and 60*a* are represented by the following formula (45).

$$TTC = \frac{R_{12}}{V_2 - V_1} \qquad (45)$$

Here, $R_{12}$ represents a distance between the vehicles 60*b* and 60*a*, $V_2$ represents a velocity of the vehicle 60*b*, and $V_1$ represents a velocity of the vehicle 60*a* (cf. FIG. 6).

Based on the TTC defined by the above formula (45), the start times of lane changes of the vehicle 60*b* are set for example in the following manner. First, when 0 seconds<TTC<1 second holds, the start time of a lane change is set to a time after 0 seconds (first condition). When 1 second≤TTC<2 seconds holds, the start times of lane changes are set to times after 0 seconds and 0.5 seconds (second condition). When 2 seconds≤TTC<3 seconds holds, the start times of lane changes are set to times after 0 seconds, 0.5 seconds, 1 second, and 1.5 seconds (third condition). When 3 seconds≤TTC holds, the start times of lane changes are set to times after 0 seconds, 0.5 seconds, 1 second, 1.5 seconds, 2 seconds, and 2.5 seconds (fourth condition). When TTC≤0 seconds holds, the start times of lane changes are set to times after 0 seconds, 0.5 seconds, 1 second, 1.5 seconds, 2 seconds, and 2.5 seconds (fifth condition).

An example for setting the start times of lane changes under the above condition is illustrated in FIG. 11. FIG. 11 represents a case of TTC that is equal to or more than two seconds and less than three seconds. The four patterns of start times of lane changes that are in the range from 0 seconds to 1.5 seconds are set, and the four patterns of predicted movement ranges for the lane changes are thereby generated.

A feature of the above settings is that the number of start times of lane changes is increased with the duration of time until the vehicle 60*b* collides with the vehicle 60*a*. For example as in the first condition, in a situation where the vehicle 60*b* collides with the vehicle 60*a* within one second when a velocity as of the present time is maintained, only a motion model where a lane change is immediately initiated is considered to be sufficient to predict, assuming that the duration of time until the vehicle 60*b* initiates a lane change is substantially zero. Meanwhile as in the fourth and fifth conditions, when there is an extra distance between the vehicles 60*b* and 60*a*, many start times of lane changes are set since the vehicle 60*b* can initiate lane changes at various times.

In the above description, the start time of a lane change is defined as seconds elapsed from the present time. Alternatively, the start time may be defined as a ratio of relative distances between other vehicles 60*b* and 60*a*. For example, a start time of a lane change $T_n^{(Steer)}$ is defined as the duration of time until a vehicle travels a certain distance of $R_{12}n/N$, and is represented by the following formula (46).

$$T_n^{(steer)} = \frac{R_{12}}{V_1} \times \frac{n}{N} \qquad (46)$$

Here, n represents an integer of 1 to N where N is calculated by the following formula (47).

$$N = \begin{cases} 1 & (0[\sec] < TTC < 1[\sec]) \\ 2 & (1[\sec] \leq TTC < 2[\sec]) \\ 4 & (0[\sec] \leq TTC < 3[\sec]) \\ 6 & (3[\sec] \leq TTC) \\ 6 & (TTC \leq 0[\sec]) \end{cases} \qquad (47)$$

In the above description, the number of start times of lane changes is determined based on the TTC, and, alternatively, may be calculated using the magnitude of a relative distance $R_{12}$ between other vehicles 60b and 60a.

As described above, one or more start times of lane changes that the vehicle 60b can select are set. Information representing N patterns of start times of lane changes, set by the course change start time setting unit 153, is output to the corresponding course change prediction unit 154. Incidentally, the number of start times of lane changes, set by this processing, is hereinafter denoted as N.

Next, the course change prediction unit 154 assumes that models for lane changes are applied as the motion models of one or more other vehicles 60, and calculates predicted movement ranges (predicted movement ranges for the lane changes) of the vehicles 60 according to the corresponding start times of the lane changes which has been set by the course change start time setting unit 153 (step ST906, lane change prediction step). That is, the course change prediction unit 154 estimates positions at respective sampling timings from the present time to a maximum prediction time of S seconds later when the vehicle 60b initiates a lane change after a time lapse of $T_n^{(Steer)}$ from the present time. n represents an integer of 1 to N. In the following, details of processing by the course change prediction unit 154 will be described. Here, with respect to an exemplary track where the lane change is initiated after a time lapse of $T_n^{(Steer)}$ from the present time, a case where a rectilinear motion at a constant velocity is applied until the time reaches $T_n^{(Steer)}$ and thereafter a lane change is performed at a constant velocity, will be described.

The course change prediction unit 154 first calculates a predicted vector $x^{(Steer,n)}_{k,m}(-)$ of a predicted movement range for a lane change of the vehicle 60b at m seconds from the present time k by the following formula (48).

$$x_{k,m}^{(Steer,n)}(-) = \Phi_{k,m-1}^{(Steer,n)} x_{k,m-1}^{(Steer,n)}(-) \quad (48)$$

Here, $\Phi^{(Steer,n)}_{k,m-1}$ is represented by the following formula (49).

$$\Phi_{k,m-1}^{(Steer,n)} = \begin{cases} \Phi_{k,m-1}^{(ConstVel)} & (m < T_n^{(Steer)}) \\ \Phi_{k,m-1}^{(Steer)} & (T_n^{(Steer)} \le m) \end{cases} \quad (49)$$

Here, $\Phi^{(ConstVel)}_{k,m-1}$ is a matrix representing the constant velocity model and $\Phi^{(Steer)}_{k,m-1}$ is a matrix set corresponding to a model for a lane change where the lane change is initiated at the time k+m.

Incidentally, initial values of the predicted vector within the predicted movement range for the lane change is represented by the following formula (50).

$$x_{k,0}^{(Steer,n)}(-) = \hat{x}_k(+) \quad (50)$$

Moreover, a prediction error covariance matrix of the predicted movement range for the lane change is calculated by the following formula (51).

$$P_{k,m}^{(Steer,n)}(-) = \Phi_{k,m-1}^{(Steer,n)} P_{k,m-1}^{(Steer,n)}(-)(\Phi_{k,m-1}^{(Steer,n)})^T + Q_{k,m-1} \quad (51)$$

Here, $Q_{k,m-1}$ represents a process covariance matrix, which is represented by the following formula (52).

$$Q_{k,m-1} = \begin{pmatrix} \frac{T_p^3}{3} I_{2\times 2} & \frac{T_p^2}{2} I_{2\times 2} \\ \frac{T_p^2}{2} I_{2\times 2} & T_p I_{2\times 2} \end{pmatrix} q \quad (52)$$

Here, q represents a preset parameter of power spectral density and $I_{2\times 2}$ represents a unit matrix of two rows and two columns.

Incidentally, initial values of the prediction error covariance matrix of the predicted movement range for the lane change are represented by the following formula (53).

$$P_{k,0}^{(Steer,n)}(-) = P_k(+) \quad (53)$$

In the above, the predicted movement range is calculated with the premise that the vehicle 60b takes a rectilinear motion at a constant velocity until the time reaches the start time of a lane change. However, the motion model is not limited thereto. There can be a motion model where a lane change is initiated after the motion is performed at a preset constant acceleration. Alternatively, a velocity and acceleration until a lane change is made may be varied depending on a relative distance and relative velocity between one vehicle 60 (a vehicle 60b in FIGS. 10(a) and 10(b)) and other vehicles (vehicles 60a and 60c, and the user's vehicle 50 in FIGS. 10(a) and 10(b)) around the vehicle 60.

In the above manner, the predicted movement ranges until S seconds later when the vehicle 60b changes lanes at time $T_n^{(Steer)}$ and prediction error covariance matrix are calculated for every tracking track. The above information is output to the course change prediction storage 155 and stored therein. A total of N pieces of information representing the predicted movement ranges for lane changes are stored.

Next, the reliability comparator 156 calculates a reliability of each of the predicted movement ranges of the vehicle 60 which are calculated based on the target tracking data stored in the target tracking data storage 4 by the prediction units 151, 152, and 154, then calculates their respective relative reliabilities, and generates a list of the relative reliabilities. The reliability comparator 156 further deletes information representing an unnecessary predicted movement range in the course change prediction storage 155 in accordance with the target observation value data stored in the data storage 2 of target observation values (step ST907, reliability comparison step). In the following, details of processing by the reliability comparator 156 will be described with reference to FIG. 12.

In the processing by the reliability comparator 156, as illustrated in FIG. 12, a reliability of the predicted movement range for a constant velocity (predicted movement ranges for a constant velocity at every sampling time from the present time to S seconds later and the prediction error covariance matrix) calculated by the constant velocity prediction unit 151 is first calculated (step ST1201).

Here, the reliability of a predicted movement range is an index representing the possibility that the vehicle 60b moves along the predicted movement range. Also, processing to calculate the reliability from the predicted movement range and prediction error covariance matrix is required to be the same in the case of predicted movement range for a constant velocity (step ST1201), in the case of predicted movement range with deceleration (step ST1202), and in the case of predicted movement ranges for lane changes (step ST1206).

A reliability of the predicted movement range for a constant velocity is represented by, for example, the following formula (54).

$$b_k^{(ConstVel)} = \min_{m,l}[M(x_{k,m}^{(ConstVel)}(-); P_{k,m}^{(ConstVel)}; x_{k,m}^{(l)}; P_{k,m}^{(l)})] \quad (54)$$

Here, M represents the probability that two predicted movement ranges are positioned at the same position and is represented by the following formula (55).

$$M(x_1, P_1; x_2, P_2) = (x_1-x_2)^T (P_1+P_2)^{-1} (x_1-x_2) \quad (55)$$

Also, $x^{(l)}_{k,m}$ represents a predicted movement range of a surrounding vehicle l around the vehicle 60 from the present time k to m seconds later and is calculated by the following formulas (56) and (57).

$$x_{k,m}^{(l)} = \Phi_{k,m}^{(ConstVel)} x_{k,m-1}^{(l)} \quad (56)$$

$$x_{k,0}^{(l)} = x_k^{(l)}(+) \quad (57)$$

Here, $x^{(l)}_k(+)$ represents an estimated vector of the surrounding vehicle l around the vehicle 60 as of the present time.

Also, $P^{(l)}_{k,m}$ represents a prediction error covariance matrix of the surrounding vehicle l around the vehicle 60 from the present time k to m seconds later and is calculated by the following formulas (58) and (59).

$$P_{k,m}^{(l)} = \Phi_{k,m-1}^{(ConstVel)} P_{k,m-1}^{(l)} (\Phi_{k,m-1}^{(ConstVel)})^T + Q_k, \\ m-1 \quad (58)$$

$$P_{k,0}^{(l)} = P_k^{(l)}(+) \quad (59)$$

Here, $P^{(l)}_k(+)$ represents an estimation error covariance matrix of the surrounding vehicle l around the vehicle 60 as of the present time.

The reliability of the above formula (54) indicates a distance representing the case where a predicted movement range of a surrounding vehicle travelling at a constant velocity is the closest to the predicted movement range of the vehicle 60. Therefore, this definition of the reliability is based on the premise that the possibility of selecting the predicted movement range of the vehicle 60 away from the surrounding vehicle is high. For example in FIG. 13, a first predicted movement range 1301 close to the user's vehicle 50 and a third predicted movement range 1303 close to the vehicle 60a are usually not selected and thus have low reliabilities, while the reliability of a second predicted movement range 1302 is high when a lane change is initiated at an intermediate time between their times.

Next, the reliability of the predicted movement range with deceleration (predicted movement ranges with deceleration at every sampling time from the present time to S seconds later and the prediction error covariance matrix) calculated by the deceleration prediction unit 152 is calculated (step ST1202).

Here, when the reliability of the predicted movement range for a constant velocity is represented by the above formula (54), the reliability of the predicted movement range with deceleration is similarly represented by the following formula (60).

$$b_k^{(Brake)} = \min_{m,l} [M(x_{k,m}^{(Brake)}(-); P_{k,m}^{(Brake)}; x_{k,m}^{(l)}; P_{k,m}^{(l)})] \quad (60)$$

Next, one predicted movement range for a lane change that is unselected as of the present time is selected from the course change prediction storage 155 (step ST1203). Here, a predicted vector of the selected predicted movement range A for the lane change is represented by $x^{(Steer,A)}_{k',m}$ and a prediction error covariance matrix of the predicted movement range A for the lane change is represented by $P^{(Steer,A)}_{k',m}$. Incidentally, since the predicted movement ranges of lane changes stored in the course change prediction storage 155 include those generated in the past, k' represents the present time or a time in the past.

Next, an index (likelihood) representing likelihood of the predicted movement range A for the lane change is calculated from a predicted position of the selected predicted movement range A for the lane change as of the present time and an observation value for the vehicle 60 as of the present time by the following formula (61) where a probability distribution of the observation values is assumed to form a Gaussian distribution with the predicted position as the center thereof (step ST1204).

$$g(z_k; x_{k',k-k'}^{(Steer,A)}, P_{k',k-k'}^{(Steer,A)}) = \\ \frac{1}{(\sqrt{2\pi})^3} \exp\left[-\frac{1}{2}(z_k - x_{k',k-k'}^{(Steer,A)})^T (P_{k',k-k'}^{(Steer,A)})^{-1} (z_k - x_{k',k-k'}^{(Steer,A)})\right] \quad (61)$$

Next, whether the calculated likelihood satisfies the following inequality (62) is determined (step ST1205).

$$g(z_k; x_{k',k-k'}^{(Steer,A)}, P_{k',k-k'}^{(Steer,A)}) < \text{Threshold}_g \quad (62)$$

Here, $\text{Threshold}_g$ is a preset threshold parameter.

In this step ST1205, when the likelihood is determined to satisfy the inequality (62), the predicted movement range A of the lane change is the motion range which the vehicle 60b may take, and, thus, the reliability of the predicted movement range A of the lane change is calculated (step ST1206).

Here, when the reliability of the predicted movement range for a constant velocity is represented by the above formula (54), the reliability of the predicted movement range A for the lane change is similarly represented by the following formula (63).

$$b_k^{(Steer,A)} = \min_{m,l} [M(x_{k,m}^{(Steer,A)}(-); P_{k,m}^{(Steer,A)}; x_{k,m}^{(l)}; P_{k,m}^{(l)})] \quad (63)$$

On the other hand, in step ST1205, when the likelihood is determined not to satisfy the inequality (62), the predicted movement range A for the lane change is assumed to be drastically different from the current position of the vehicle 60 and thus information representing the predicted movement range A for the lane change is deleted from the course change prediction storage 155 (step ST1207).

Next, whether all predicted movement ranges for lane changes stored in the course change prediction storage 155 are selected is determined (step ST1208). In this step ST1208, when there is information representing unselected predicted movement range for the lane change in the course change prediction storage 155, the sequence returns to step ST1203 and repeat the aforementioned processing.

On the other hand, in step ST1208, when all predicted movement ranges for lane changes stored in the course change prediction storage 155 are determined to be selected, reliabilities of the respective predicted movement ranges converted into relative reliabilities (step ST1209). Incidentally, the relative reliability is an index representing a result of comparing the reliabilities of the respective predicted movement ranges calculated in steps ST1201, 1202, and 1206 and calculated by, for example the following formula (64).

$$\beta_{p,k} = \frac{b_{p,k}}{B_k} \quad (64)$$

Here, $b_{p,k}$ represents a reliability of any one of the predicted movement ranges of the vehicle 60$b$ and $B_k$ represents the sum of reliabilities calculated in steps ST1201, 1202, and 1206.

For example, when a relative reliability of a predicted movement range A for the lane change is 0.6, prediction that "the vehicle 60$b$ takes the motion of predicted movement range A for the lane change with a possibility of 60%" is made.

Also, based on the idea that "the vehicle 60$b$ prioritizes and selects a motion to stay in a lane", only the relative reliability of the predicted movement range for a lane change may be set low.

The above steps ST1201 to ST1209 provides a list listing predicted movement ranges that the vehicle 60$b$ may take as of the present time k and relative reliabilities representing the level of relative feasibility thereof. This list is output to the own-collision possibility estimator 11$b$ and used for determination of the collision possibility of the collision with the user's vehicle 50.

Also, in the above description, the reliability is calculated based on a relative distance between the vehicle 60$b$ and its surrounding vehicle. In this regard, based on the idea that "the vehicle 60$b$ avoids a track to approach a vehicle which may cause a great damage if collided with", the reliability may be calculated based on a relative velocity between the vehicle 60$b$ and a surrounding vehicle. Moreover, based on the idea that "the vehicle 60$b$ tends to select a gentler change of lanes", a predicted movement range making a gentler angle when the vehicle 60$b$ performs a lane change may have a higher reliability.

Returning again to the overall operations of the collision avoidance device illustrated in FIG. 9, the own-motion sensor 8 observes motion quantities that include a position and velocity of the user's vehicle 50 (step ST908, own-motion step). This processing is similar to that of the first embodiment. Information representing an observation resulting from the own-motion sensor 8 (own-motion data) is output to and stored in the own-motion data storage 9.

Next, the own-motion prediction unit 10 predicts a position and velocity in the future of the user's vehicle 50, based on the own-motion data stored in the own-motion data storage 9, and calculates a predicted movement range of the user's vehicle 50 using a prediction error covariance matrix thereof (step ST909, own-motion prediction step). This processing is similar to that of the first embodiment. Information representing the predicted movement range of the user's vehicle 50 calculated by the own-motion prediction unit 10 is output to an own-collision possibility estimator 11$b$.

Next, the own-collision possibility estimator 11$b$ estimates a collision possibility between the user's vehicle 50 and the vehicle 60, based on overlap between the predicted movement range of the user's vehicle 50 calculated by the own-motion prediction unit 10 and the predicted movement range of the vehicle 60 present in the list obtained by the target-motion prediction unit 15, as well as based on the reliability (relative reliability) of the predicted movement range of the vehicle 60 present in the list (step ST910, own-collision possibility estimation step).

Specifically, the estimation of the collision possibility is performed according to whether the following formula (65) is satisfied or not. If the following formula (65) is satisfied, possible collision between the user's vehicle 50 and the vehicle 60 is estimated to occur.

$$\beta_{p,k} \times M(x_{uf,k}(-); P_{uf,k}(-); x_{p,k}; P_{p,k}) < \text{threshold}_M \tag{65}$$

Here, $x_{p,k}$ and $P_{p,k}$ represent the predicted movement range of the vehicle 60$b$ corresponding to a relative reliability $\beta_{p,k}$ and prediction error covariance matrix, respectively. Here, threshold$_M$ is a preset threshold parameter.

Information representing the collision possibility between the user's vehicle 50 and the vehicle 60 estimated by the own-collision possibility estimator 11$b$ is output to the braking determination unit 12.

Next, the braking determination unit 12 determines if braking is required on the user's vehicle 50, based on the estimation result from the own-collision possibility estimator 11$b$ (step ST911, control determination step). When the own-collision possibility estimator 11$b$ estimates collision possibility between the user's vehicle 50 and the vehicle 60 and the braking determination unit 12 determines that braking of the user's vehicle 50 is required, the automatic braking system 13 executes a deceleration function of the user's vehicle 50 by automatic braking or the warning generator 14 represents a message or outputs sound to convey that brake operation is required at the present time to a driver of the user's vehicle 50.

Repeating the above processing periodically allows a collision avoidance response of the user's vehicle 50 all the time.

In this manner, this second embodiment is configured to allow the number of models for lane changes to be variable from the positions and velocities between other vehicles 60. Therefore, for example such prediction as considering the case of delayed initiation of a lane change by a parallelly travelling vehicle as illustrated in FIGS. 10(*a*) and 10(*b*), thereby allowing further improvement of the accuracy in determination on the collision possibility of the collision with the user's vehicle 50 as compared to the first embodiment. Moreover, in the second embodiment, the number of models for lane changes is variable according to the positions and velocities between other vehicles 60. Therefore, calculation processing of a predicted movement range with low feasibility is omitted, thereby allowing calculation burden of calculation processing for each vehicle 60 to be reduced.

Third Embodiment

In the second embodiment, described is the case where one or more start times of lane changes are set according to a state of open space around other vehicles 60, thereby allowing the number of models for lane changes (course change models) to be variable. In contrast, in the third embodiment, described is a case where one or more parameters are set for each of the deceleration model and models for lane changes, according to a state of open space around other vehicles 60.

FIG. 14 is a diagram illustrating a configuration of a collision avoidance device according to the third embodiment of the invention. The collision avoidance device according to the third embodiment illustrated in FIG. 14 is, with respect to the collision avoidance device according to the second embodiment illustrated in FIG. 8, added with a deceleration parameter setting unit 157, provided with multiple deceleration prediction units 152, and replaced of the course change start time setting unit 153 with a course change parameter setting unit 158. Other configurations are similar and thus denoted with the same symbols while only different points are described.

The deceleration parameter setting unit 157 sets one or more parameters in the deceleration model, based on positions and velocities between other vehicles 60, using the target tracking data stored in the target tracking data storage 4. Information representing the parameters set by the deceleration parameter setting unit 157 is output to the corresponding deceleration prediction unit 152.

Also, the deceleration prediction unit 152 assumes that a deceleration model is applied using the corresponding parameters set by the deceleration parameter setting unit 157, and calculates a predicted movement range (predicted movement range with deceleration) of each vehicle 60.

The course change parameter setting unit 158 sets one or more parameters in the models for lane changes, based on positions and velocities between the vehicles 60, using the target tracking data stored in the target tracking data storage 4. Information representing the parameters set by the course change parameter setting unit 158 is output to the corresponding course change prediction unit 154.

The course change prediction unit 154 assumes that a model for a lane change is applied using the corresponding parameters set by the course change parameter setting unit 158, and calculates a predicted movement range (predicted movement range for the lane change) of each vehicle 60.

Here, the parameter in the deceleration model, set by the deceleration parameter setting unit 157, is, for example, an acceleration of the vehicle 60.

Also, the parameters in the model for a lane change, set by the course change parameter setting unit 158, may be defined, for example, as follows: a start time of the lane change that represents how many minutes later from the present time a lane change is initiated; an angle of a lane change (course change angle) that represents the level of an angle relative to a lane upon lane changing; an acceleration before a lane change that represents the level of a positive acceleration or deceleration before the lane change is initiated; an acceleration during a lane change that represents the level of a positive acceleration or deceleration during the lane change; and an acceleration after a lane change that represents the level of a positive acceleration or deceleration after the lane change.

In this manner, this third embodiment is configured to set, from positions and velocities between other vehicles 60, one or more parameters for the deceleration model and model for a lane change, according to a state of open space around each vehicle 60. Therefore, for example, the motion of the vehicle 60 to decelerate according to a velocity of an a front vehicle can be predicted, thereby further improving the accuracy in determination of the collision possibility of the collision with a user's vehicle 50 as compared to the first embodiment. Furthermore, the motion of the vehicle 60 to adjust an angle of a lane change and acceleration before and after the lane change can be predicted according to a space between vehicles in a destination lane, thus further improving the accuracy in determination of the possibility of collision with the user's vehicle 50.

Note that, in the above, the exemplary case is described where the collision avoidance device according to the present invention is applied to an automobile and collision between the user's vehicle 50 and one or more other vehicles 60 existing therearound is avoided. Nonetheless, a collision avoidance device according to the present invention is not limited thereto and may be applied to another moving body (ship, airplane, etc.) to avoid collision with a target (ship, airplane, etc.) existing therearound, where similar effects can be obtained.

Incidentally, within the scope of the present invention, the present invention may include a flexible combination of the respective embodiments, a modification of any component of the respective embodiments, or an omission of any component in the respective embodiments.

INDUSTRIAL APPLICABILITY

A collision avoidance device according to the present invention allows the detections of motions of multiple targets thereby to improve the accuracy in motion prediction, and is suitable for predicting motions of one or more targets existing around a moving body having the collision avoidance device to avoid collision with the moving body.

EXPLANATIONS OF REFERENCE NUMERALS

1 target observation sensor; 2 data storage of target observation values; 3 target tracker; 4 target tracking data storage; 5 target-motion prediction unit; 6 inter-target collision possibility estimator; 7 target-motion re-prediction unit; 8 own motion sensor; 9 own motion data storage; 10 own motion prediction unit; 11, 11*b* own collision possibility estimator; 12 braking determination unit; 13 automatic braking system; 14 warning generator; 15 target-motion prediction unit; 50 user's vehicle; 60, 60*a* to 60*c* other vehicles; 151 constant velocity prediction unit; 152 deceleration prediction unit; 153 course change start time setting unit; 154 course change prediction unit; 155 course change prediction storage; 156 reliability comparator; 157 deceleration parameter setting unit; 158 course change parameter setting unit.

The invention claimed is:

1. A collision avoidance device comprising:
    a target observation sensor to observe one or more targets existing around a moving body on which the collision avoidance device is installed;
    a target tracker to, assuming that one or more motion models selected from among a plurality of prescribed motion models are applied, track the one or more targets while assigning weights indicative of reliabilities of the one or more motion models to the one or more motion models, on a basis of an observation result from the target observation sensor;
    a target-motion prediction unit to calculate predicted movement ranges of the one or more targets, based on a tracking result from the target tracker;
    an inter-target collision possibility estimator to, when a plurality of the targets exists, estimate a collision possibility between the targets based on overlap of the predicted movement ranges of the targets calculated by the target-motion prediction unit;
    a target-motion re-prediction unit to, when the inter-target collision possibility estimator estimates possible collision between the targets, change the weights so as to prioritize a motion model causing collision to be avoided, and to again calculate predicted movement ranges of the targets before the targets take actions to avoid collision;
    an own-motion sensor to observe a motion of the moving body;
    an own-motion prediction unit to calculate a predicted movement range of the moving body based on an observation result from the own-motion sensor; and
    an own-collision possibility estimator to estimate collision possibilities between the moving body and the one or more targets, based on overlap between the predicted movement range of the moving body calculated by the own-motion prediction unit, and the predicted movement ranges of the targets with no collision possibility between the targets, calculated by the target-motion prediction unit or the target-motion re-prediction unit.

2. The collision avoidance device according to claim 1, wherein the target-motion re-prediction unit assigns, upon selection of motions to be performed by the one or more targets to avoid collision, weights to the motions in accordance with a state of open space around the one or more targets.

3. The collision avoidance device according to claim 1, wherein the target-motion re-prediction unit assigns, upon selection of motions to be performed by the one or more targets to avoid collision, weights to the motions such that the one or more targets prioritize a rectilinear motion.

4. A collision avoidance device comprising:
a target observation sensor to observe one or more targets existing around a moving body on which the collision avoidance device is installed;
a target tracker to track the one or more targets on a basis of an observation result from the target observation sensor;
a target-motion prediction unit to set motion models based on locations and velocities of the one or more targets in accordance with a state of open space around the one or more targets, using a tracking result from the target tracker, and to calculate predicted movement ranges of the one or more targets and reliabilities of the predicted movement ranges;
an own-motion sensor to observe motion of the moving body;
an own-motion prediction unit to calculate a predicted movement range of the moving body, based on an observation result from the own-motion sensor; and
an own-collision possibility estimator to estimate a collision possibility between the moving body and the target, based on the reliabilities of the predicted movement ranges of the one or more targets, and on overlap between the predicted movement range of the moving body calculated by the own-motion prediction unit and the predicted movement ranges of the one or more targets calculated by the target-motion prediction unit.

5. The collision avoidance device according to claim 4, wherein the target-motion prediction unit sets one or more start times for a course change in a course change model that is a motion model of the target, in accordance with a state of open space around the target.

6. The collision avoidance device according to claim 4, wherein the target-motion prediction unit sets one or more accelerations in a deceleration model that is a motion model of the target, in accordance with a state of open space around the target.

7. The collision avoidance device according to claim 4, wherein the target-motion prediction unit sets one or more accelerations and course change angles in a course change model that is a motion model of the target, in accordance with a state of open space around the target.

* * * * *